United States Patent
Tang et al.

(10) Patent No.: US 12,190,881 B2
(45) Date of Patent: *Jan. 7, 2025

(54) SUPPORTING AUDIO ELEMENT WITH VOICE RECOGNITION FOR A FURNITURE ITEM

(71) Applicant: eMoMo Technology Co., Ltd., Shenzhen (CN)

(72) Inventors: Wenji Tang, Shenzhen (CN); Daniel Jackson Beck, II, Carthage, MO (US); Mario Ernesto Fontana, Meda (IT)

(73) Assignee: eMomo Technology Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/181,936

(22) Filed: Mar. 10, 2023

(65) Prior Publication Data
US 2023/0317075 A1 Oct. 5, 2023

Related U.S. Application Data

(63) Continuation of application No. 16/812,178, filed on Mar. 6, 2020, now Pat. No. 11,631,405, which is a
(Continued)

(30) Foreign Application Priority Data

Nov. 23, 2018 (CN) .......................... 201811410254.5
Dec. 24, 2018 (CN) .......................... 201811583854.1
May 6, 2019 (CN) .......................... 201910370389.1

(51) Int. Cl.
*G10L 15/08* (2006.01)
*G06F 3/16* (2006.01)
(Continued)

(52) U.S. Cl.
CPC .............. *G10L 15/22* (2013.01); *G06F 3/167* (2013.01); *G10L 15/187* (2013.01); *H04R 1/025* (2013.01); *H04R 1/04* (2013.01); *G10L 2015/223* (2013.01)

(58) Field of Classification Search
USPC .......... D14/432–447, 217–238; 381/86–118, 381/345–361; 984/86–118, 345–361;
(Continued)

(56) References Cited

U.S. PATENT DOCUMENTS

D392,976 S 3/1998 Fenner et al.
D488,147 S 4/2004 Solland
(Continued)

FOREIGN PATENT DOCUMENTS

CN 205285538 U 6/2016
CN 109431130 A 3/2019

OTHER PUBLICATIONS

Lin, Wei-Jian, Semi-spherical Sound Box; 2001 (Year: 2001).*
(Continued)

*Primary Examiner* — Marcellus J Augustin
(74) *Attorney, Agent, or Firm* — Womble Bond Dickinson (US) LLP

(57) ABSTRACT

An exemplary supporting audio element for a furniture item may include a control circuit positioned within a body portion, a supporting leg, and a loudspeaker. The supporting audio element may be mounted to a furniture item, for supporting the furniture item, and configured for one or more of, without limitation, communicating with an external audio device, playing audio, controlling a function of the furniture item, voice recognition, and voice control. An exemplary supporting audio element may include a microphone connected to a phonetic recognition module, for receiving and recognizing voice commands and relaying the
(Continued)

voice commands to the control circuit for controlling a function of the supporting audio leg and the furniture item. A furniture item may include an exemplary supporting audio element for incorporating the features thereof.

17 Claims, 27 Drawing Sheets

Related U.S. Application Data continuation-in-part of application No. PCT/CN2019/126624, filed on Dec. 19, 2019, and a continuation-in-part of application No. 16/586,265, filed on Sep. 27, 2019, now Pat. No. 11,450,317, and a continuation-in-part of application No. 29/695,281, filed on Jun. 18, 2019, now Pat. No. Des. 906,789, and a continuation-in-part of application No. 29/670,191, filed on Nov. 14, 2018, now Pat. No. Des. 909,182.

(51) Int. Cl.
  *G10L 15/187* (2013.01)
  *G10L 15/22* (2006.01)
  *H04R 1/02* (2006.01)
  *H04R 1/04* (2006.01)

(58) Field of Classification Search
  USPC .................................................. 704/1–275
  See application file for complete search history.

(56) References Cited

U.S. PATENT DOCUMENTS

| | | | |
|---|---|---|---|
| 6,724,102 B1 | 4/2004 | Kelwaski et al. | |
| D522,492 S | 6/2006 | Carbone | |
| D525,615 S | 7/2006 | Tanaka et al. | |
| D562,307 S | 2/2008 | Warden | |
| D596,157 S | 7/2009 | Warden et al. | |
| D681,007 S | 4/2013 | Ryu et al. | |
| D776,638 S | 1/2017 | Pietschmann et al. | |
| D788,718 S | 6/2017 | Tang et al. | |
| D813,179 S | 3/2018 | Wu et al. | |
| D813,838 S | 3/2018 | Pietschmann et al. | |
| D841,614 S | 2/2019 | Krapfl et al. | |
| D841,623 S | 2/2019 | Nugent et al. | |
| D857,647 S | 8/2019 | Pietschmann et al. | |
| D884,672 S | 5/2020 | Nugent et al. | |
| D884,685 S | 5/2020 | Chen | |
| D886,771 S | 6/2020 | Naddei | |
| D887,389 S | 6/2020 | Zhang | |
| D888,020 S | 6/2020 | Lyu et al. | |
| D890,730 S | 7/2020 | Lu | |
| D890,731 S | 7/2020 | Lu et al. | |
| D895,566 S | 9/2020 | Laube et al. | |
| D895,583 S | 9/2020 | Smith et al. | |
| D896,779 S | 9/2020 | Lin | |
| 2014/0086442 A1* | 3/2014 | Goto | H04R 1/028 381/333 |
| 2014/0306505 A1 | 10/2014 | Koch | |
| 2017/0206900 A1* | 7/2017 | Lee | H04R 1/406 |
| 2018/0199716 A1 | 7/2018 | Bertinato et al. | |
| 2019/0216228 A1 | 7/2019 | Bertinato et al. | |
| 2020/0020329 A1* | 1/2020 | Gordon | G10L 25/51 |
| 2022/0078555 A1* | 3/2022 | Nelson | H04R 1/028 |

OTHER PUBLICATIONS

Wang, Jian-Ping; A Hotel Dining Table; 2016 (Year: 2016).*
Hayashi Shigeaki; Display Device;2002 (Year: 2002).*
Display Device; 2002 (Year: 2002).*
United States Patent and Trademark Office; Final Office Action for U.S. Appl. No. 16/586,265; dated Oct. 22, 2021; 11 pages.
United States Patent and Trademark Office; Final Office Action for U.S. Appl. No. 16/812,178; dated Sep. 12, 2022; 26 pages.
United States Patent and Trademark Office; Non-Final Office Action for U.S. Appl. No. 16/586,265; dated Apr. 28, 2021; 10 pages.
United States Patent and Trademark Office; Non-Final Office Action for U.S. Appl. No. 16/812,178; dated Apr. 21, 2022; 20 pages.
United States Patent and Trademark Office; Notice of Allowance for U.S. Appl. No. 16/812,178; dated Dec. 15, 2022; 12 pages.

* cited by examiner

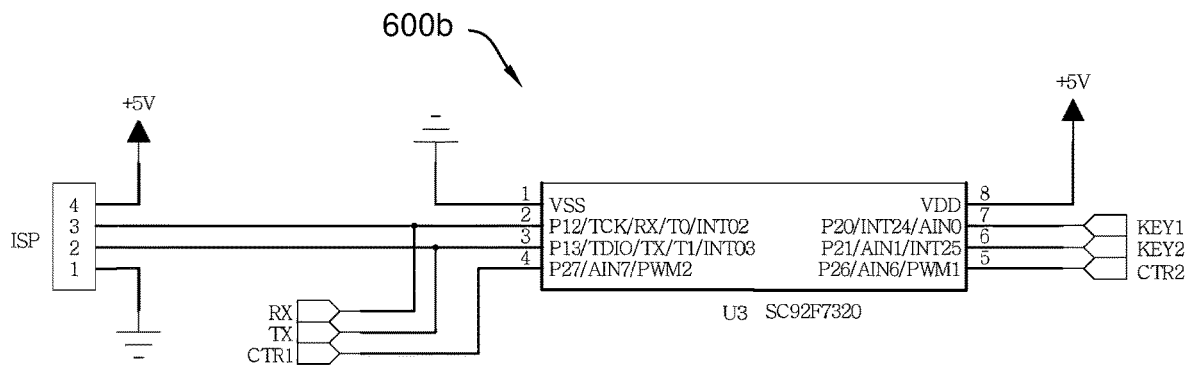
FIG. 6
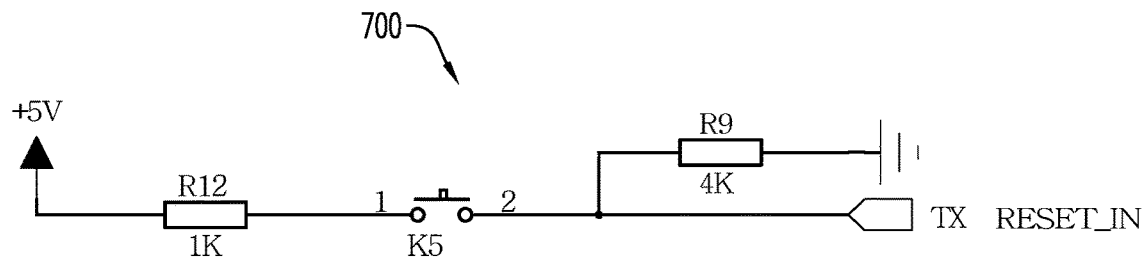
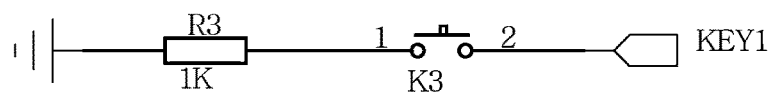
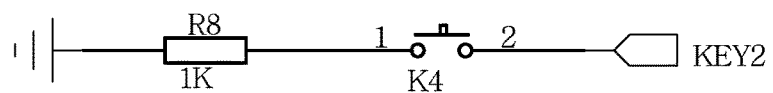
FIG. 7

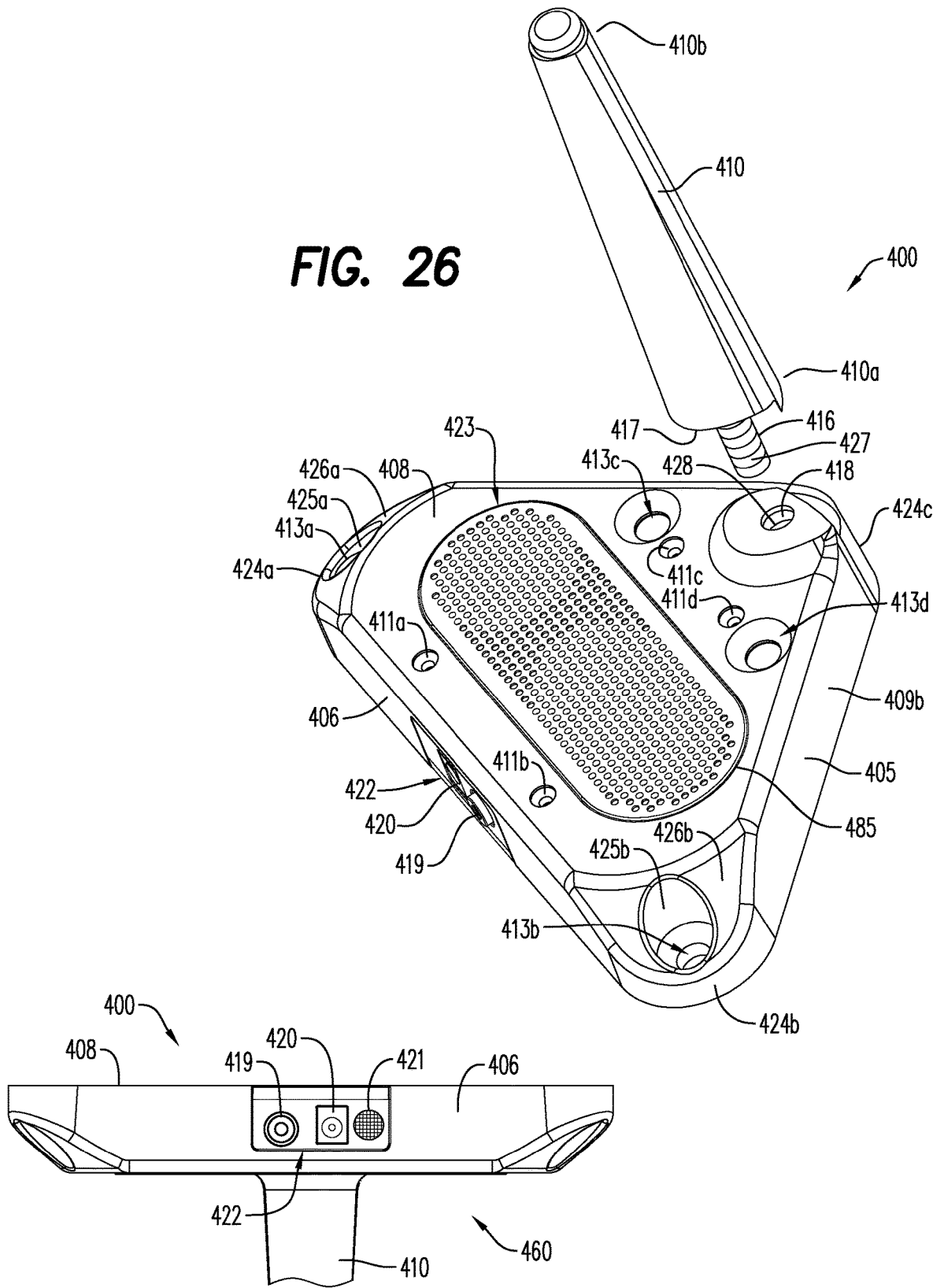

SUPPORTING AUDIO ELEMENT WITH VOICE RECOGNITION FOR A FURNITURE ITEM

CROSS-REFERENCE TO RELATED APPLICATIONS

This application is a continuation of and claims priority to U.S. patent application Ser. No. 16/812,178 filed Mar. 6, 2020. U.S. patent application Ser. No. 16/812,178 is a continuation-in-part of and claims priority to Patent Cooperation Treaty Application No. PCT/CN2019/126624 filed Dec. 19, 2019, which claims priority to CN Patent Application No. 201811583854.1 filed Dec. 24, 2018. U.S. patent application Ser. No. 16/812,178 is also a continuation-in-part of and claims priority to U.S. patent application Ser. No. 16/586,265 filed Sep. 27, 2019, which claims priority to CN Patent Application No. 201811410254.5 filed Nov. 23, 2018. U.S. patent application Ser. No. 16/812,178 is also a continuation-in-part of and claims priority to U.S. Design patent application Ser. No. 29/695,281 filed Jun. 18, 2019, which claims priority to CN Patent Application No. 201910370389.1 filed May 6, 2019, which claims priority to CN Patent Application No. 201811583854.1 filed Dec. 24, 2018. U.S. patent application Ser. No. 16/812,178 also claims priority to CN Patent Application No. 201910370389.1 filed May 6, 2019. U.S. patent application Ser. No. 16/812,178 is also a continuation-in-part of and claims priority to U.S. Design patent application Ser. No. 29/670,191 filed Nov. 14, 2018. Accordingly, the present application claims priority to all of the applications listed above. Each of the above applications is incorporated herein by reference in its entirety.

BACKGROUND OF THE DISCLOSURE

The disclosure relates to a furniture controller, in particular a smart furniture controller with voice recognition, belonging, for example and without limitation, to the technical field of smart furniture.

With the improvement of people's living standards, people's requirements for quality of life are getting higher and higher. Traditional furniture can no longer meet people's requirements in daily life, giving way to more and more intelligent furniture in everyday life. Take a smart sofa as example, when the seat back rises and falls, the position of the person on the cushion also changes. For example, when the seat back is lowered, the person will move his/her hip backwards and vice versa. The rise and fall of the sofa can be controlled by the up and down buttons. The electric recliners can adjust the seat cushion following the movement of the back part. In order to make the sofa more comfortable, when the seat back rises, two head rests rise on the waist and head parts, giving support to the user's head and waist; when the back is lowered to the flat position, the person can lie down and rest, and the seatback is horizontally flat with a headrest only at the head part. There are more sophisticated models as the double electric power sofas and triple electric power sofas. When sitting, the seat back is up, and there is no need for a footstool in front. The feet can easily be placed on the floor or in a footbath. When the footstool is needed, it can smoothly come out. However, the footstool has an oblique design with a slightly low bearing capacity, making this kind of structure more complicated but at the same time more reliable and sophisticated. Quadruple and quintuple electric power sofas are designed based on the triple electric power sofa, adding a waist device at the seat back and lifting armrests. The electric massage system is equipped with massagers at the neck, back, waist and buttocks including vibrating, rolling, airbag and robotic massagers. Electric heating and cooling are realized by adding coolers, such as Peltier Thermoelectric Coolers ("PCT coolers"), and heaters, such as Positive Temperature Coefficient heaters ("PCT heaters") into the seat cushion and seat back so as to provide more comfortable experience.

In addition to the smart sofa, there are smart beds and other smart furniture. For the currently used smart furniture controllers, the control buttons are embedded in the furniture. When using it, people have to press these buttons to operate the furniture, which is not convenient enough.

Other miscellaneous functions have been added to the traditional furniture, such as music playing, charging via Universal Serial Bus (USB) connections, etc. However, basically, this is achieved only through setting related function interfaces or modules on the original furniture, posing relatively large influence on the overall beauty of the furniture. Accordingly, there is a current need for components that add up more features to traditional furniture items without affecting its general structure or beauty.

In view of the above deficiencies for smart furniture control and operation, such as inconvenient control and operation and impacts on the overall appearance of the furniture item, a need exists for more convenient and aesthetically unobtrusive control devices, systems, and methods for smart furniture control. Further, a need exists for a furniture controller for smart furniture control and operation that can be incorporated discretely into the furniture without requiring a visible controller.

BRIEF DESCRIPTION OF THE EXEMPLARY EMBODIMENTS

The exemplary embodiments relate to a supporting audio leg for a furniture item. In an exemplary embodiment, the supporting audio leg for a furniture item comprises a body portion including a body portion housing, wherein the body portion housing defines an interior area of the body portion, and a supporting post connected to and extending away from the body portion housing. The supporting audio leg can be configured to support and elevate a furniture item body above a ground surface. A loudspeaker may be positioned within the interior area of the body portion. The body portion housing may include a speaker opening, with the loudspeaker facing the speaker opening. In some embodiments, the speaker opening may be configured to be oriented downward towards the ground surface.

In another aspect, the exemplary embodiments relate to a furniture item with one or more supporting audio leg. The furniture item includes a furniture item body, having a bottom surface, and a main supporting audio leg, which includes a body portion attached to the bottom surface of the furniture item body at a first location and a leg portion or supporting post connected to and extending away from the body portion. The body portion includes a body portion housing defining an interior area of the body portion and a main loudspeaker is positioned within the interior area of the body portion. In some embodiments, the main supporting audio leg may further include a control circuit positioned within the interior area of the body portion of the main supporting audio leg. By way of example, the control circuit can have a phonetic recognition module and an audio processing and controlling module electrically connected to the phonetic recognition module, with the phonetic recognition module being configured to receive a speech signal from a microphone, the phonetic recognition module being configured for recognizing a voice command in the speech signal and relaying the voice command to the audio processing and controlling module, and the audio processing and controlling module being configured for controlling a function responsive to the voice command. The main supporting audio leg is configured to support the furniture item body and to extend from the bottom surface of the furniture item body to elevate the furniture item body above a ground surface.

In a further aspect, the exemplary embodiments relate to a supporting leg configured to support and elevate a furniture item body above a ground surface. The supporting leg comprises a body portion including a body portion housing, wherein the body portion housing defines an interior area of the body portion, a supporting post connected to an extending away from the body portion housing, and a control circuit positioned within the interior area of the body portion. The control circuit may include a phonetic recognition module and an audio processing and controlling module electrically connected to the phonetic recognition module. The phonetic recognition module may be configured to receive a speech signal from a microphone, the phonetic recognition module may be configured for recognizing a voice command in the speech signal and relaying the voice command to the audio processing and controlling module, and the audio processing and controlling module may be configured for controlling a function responsive to the voice command.

BRIEF DESCRIPTION OF THE DRAWINGS

A more particular description will be rendered by reference to exemplary embodiments that are illustrated in the accompanying figures. Understanding that these drawings depict exemplary embodiments and do not limit the scope of this disclosure, the exemplary embodiments will be described and explained with additional specificity and detail through the use of the accompanying drawings in which:

FIG. 6 is a circuit schematic diagram of a second portion of the main control unit according to an embodiment;

FIG. 7 is a circuit schematic of a button module according to an embodiment;

FIG. 26 is a perspective view of a supporting audio element with an interchangeable supporting post, according to an exemplary embodiment;

FIG. 27 is a rear view of a supporting audio element with a microphone port, according to an exemplary embodiment;

Figure 1:
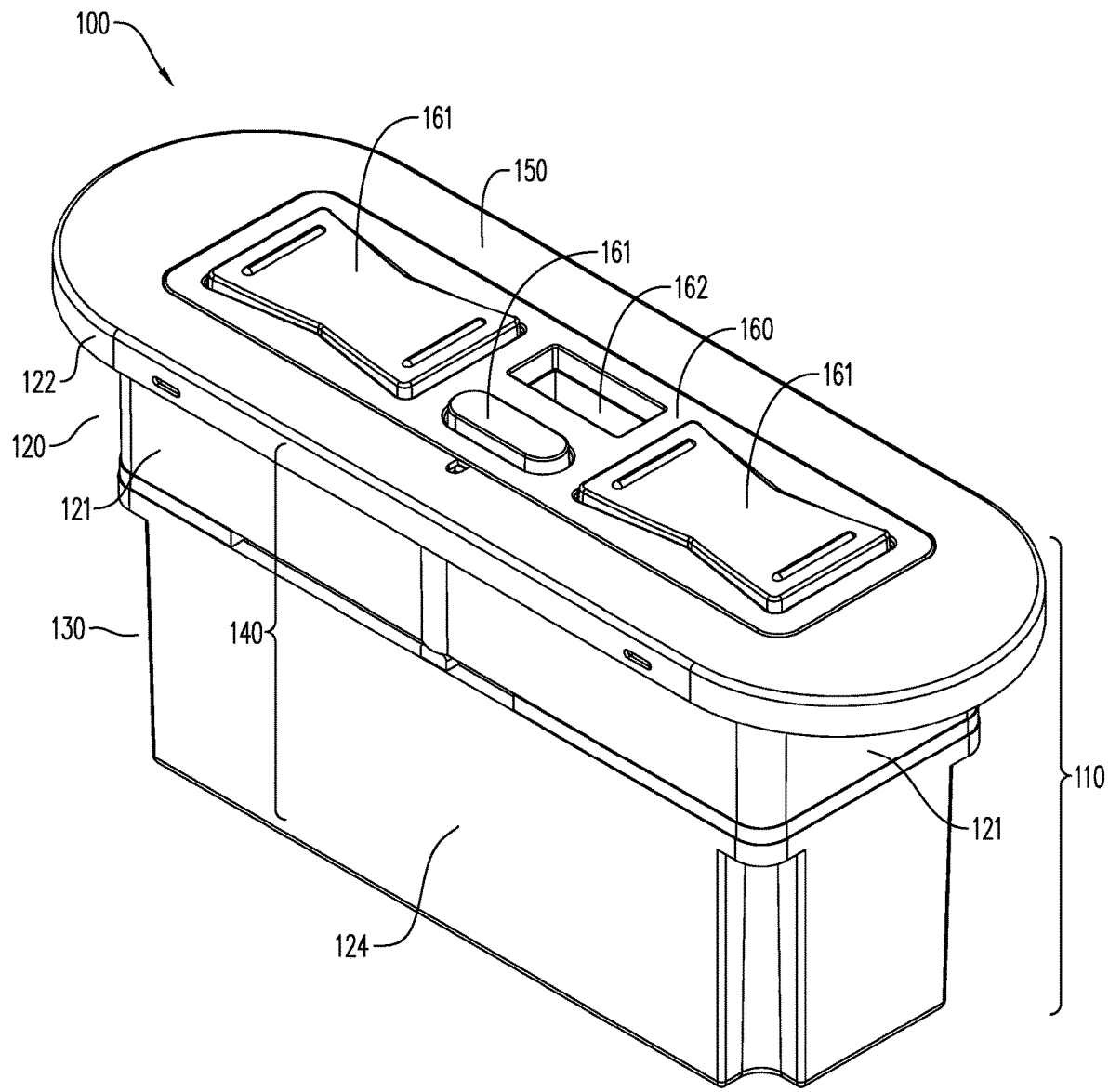
FIG. 1 is a perspective view of a three-dimensional structure of a smart furniture controller with voice recognition, according to an embodiment.

Various features, aspects, and advantages of the exemplary embodiments will become more apparent from the following detailed description, along with the accompanying drawings in which like numerals represent like components throughout the figures and detailed description. The various described features are not necessarily drawn to scale in the drawings but are drawn to emphasize specific features relevant to some embodiments.

The headings used herein are for organizational purposes only and are not meant to limit the scope of the disclosure or the claims. To facilitate understanding, reference numerals have been used, where possible, to designate like elements common to the figures.

DETAILED DESCRIPTION

This disclosure provides exemplary embodiments of a smart furniture controller with voice recognition, which integrates a voice recognition module in the controller. With the voice recognition module, the voice sound and associated commands may be recognized, making possible for the smart furniture to be controlled by voice.

An exemplary embodiment of this disclosure is a smart furniture controller with voice recognition and including a controller body and a control circuit. The control circuit is disposed in the controller body. The control circuit includes a main control unit, a voice recognition module, an operation panel, a control output interface and a power module. The voice recognition module is connected to the main control unit; a microphone is connected to the voice recognition module; the operation panel is connected to the main control unit, and the control output interface is connected to the main control unit.

In other aspects, the exemplary embodiments of a smart furniture controller may include: a loudspeaker connected to the voice recognition module, a control box in which the control output interface is disposed, and an auxiliary control unit disposed in the control box, wherein the auxiliary control unit and the main control unit are connected, and the control output interface and the auxiliary control unit are connected. In the exemplary embodiments, the control output interface may include, among other things, an actuator control interface, a heating pad control interface, a light control interface, a massage motor interface, a kneading interface, and the like as described herein and/or known functions of smart and/or functional furniture.

In a further aspect, the controller may include a power module, which adopts a voltage converter. A security fuse is connected in series with the input end of the voltage converter, and a Transient-Voltage-Suppression (TVS) diode is connected to the front end of the security fuse.

In still a further aspect, a main body of the controller body includes a front outer casing, a rear outer casing, a circuit board and buttons. The front outer casing and the rear outer casing are installed together in an opposite direction to form an outer casing. The circuit board is disposed inside the outer casing and the buttons correspond to the position and architecture of the circuit board.

In an exemplary controller body, the front outer casing is covered with a mask, which is equipped with an interface. The control output interface is disposed at a position of the circuit board corresponding to the interface in the mask.

Reference will now be made in detail to various embodiments. Each example is provided by way of explanation and is not meant as a limitation and does not constitute a definition of all possible embodiments.

For purposes of this disclosure, "connected" means in electrical contact or communication, except where the disclosure makes clear that "connected" refers to a purely physical connection. Electrical contact or communication includes, for example and without limitation, one or more physical connections between conductive components, either directly or through intermediate conductive components or relays, and wireless communication such as by Bluetooth transmission or the like, and/or as described for particular aspects of this disclosure. Electrical contact or communication may provide, for example and without limitation, a path for transmission of electrical power, digital signals, one-way or two-way communication via radio waves, and the like.

Where the disclosure makes clear that "connected" refers to a purely physical connection or joining, "connected", for purposes of this disclosure, means integrally formed, or securely, separably, or removably joined by known techniques consistent with the disclosure.

For purposes of this disclosure, relative terms including, without limitation, "top", "bottom", "above", "below", "within", etc. are used to aid the description of, e.g., configurations of features as shown in the accompanying figures, and otherwise as the disclosure makes clear. Such relative terms do not imply any particular dimension or delineation of or between features except where the disclosure makes clear.

Embodiments described herein relate generally to devices, systems, and methods for smart furniture control including voice recognition. For purposes of this disclosure, the phrases "devices," "systems," and "methods" may be used either individually or in any combination referring without limitation to disclosed components, grouping, arrangements, steps, functions, or processes.

For purposes of illustrating features of the embodiments, an exemplary embodiment will now be introduced and referenced throughout the disclosure. It will be understood that this example and other exemplary embodiments described in this disclosure are illustrative and not limiting and are provided purely for explanatory purposes.

Figure 2:
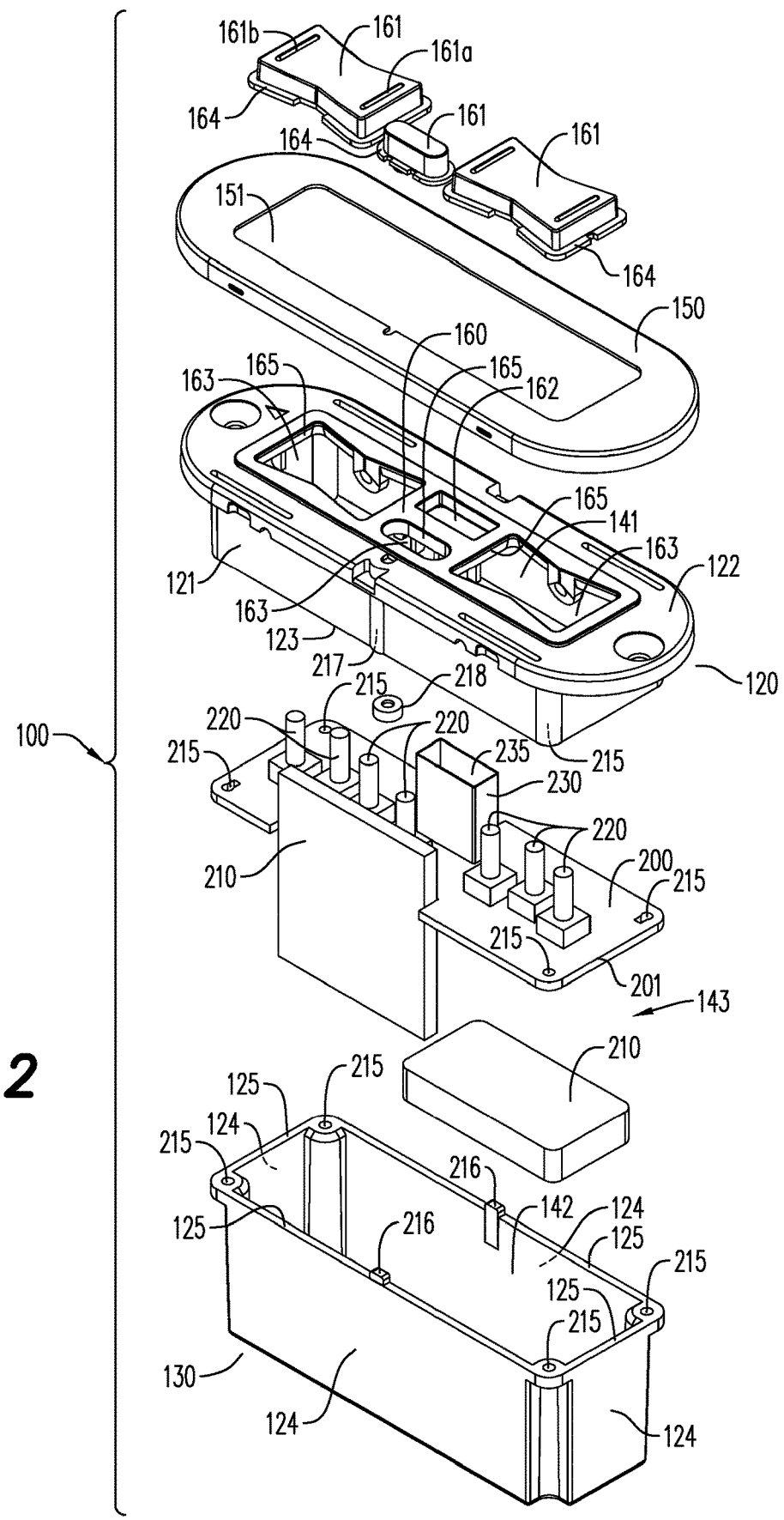
FIG. 2 is a decomposition diagram of smart furniture controller with voice recognition, according to an embodiment.

With reference to FIGS. 1 and 2, an exemplary smart furniture controller 100 includes, among other things, a main body 110 incorporating a front casing (or, "front outer casing") 120 connected to a top of a back casing (or, "rear outer casing") 130. The front casing 120 has a skirt 121 extending downwardly from an upper plate 122 of the front casing 120. The skirt 121 is dimensioned such that a bottom surface 123 of the skirt 121 substantially abuts respective top surfaces 125 of complementarily-configured back casing sidewalls 124 when the front casing 120 and the back casing 130 are joined. The connected front casing 120 and back casing 130 together define an outer casing 140 of the main body 110.

The main body 110 further includes a mask 150 affixed to the top of the upper plate 122 of the front casing 120. The mask 150 may be attached to the upper plate 122 by any known technique for joining components consistent with this disclosure, including, without limitation, snap fits, tongue-in-groove structures, adhesives, clips, and the like. The mask 150 circumscribes an operation array 160 portion of the upper plate 122 of the front casing 120 and the operation array 160 is exposed through an open central portion 151 (FIG. 2) through the mask 150. The operation array 160 contains a plurality of interface buttons 161 exposed therethrough, as further shown and described with respect specifically to FIG. 2. The plurality of interface buttons 161 may control, without limitation, power to various functions of the furniture item, control of various functions of the furniture item, volume of a loudspeaker (as described below) of the furniture item, and the like, and may be shaped and arranged in any configuration according to desired designs for one or more operation interfaces. The operation array 160 further includes an interface 162 therethrough as shown and described with respect to FIG. 2.

With reference now in particular to FIG. 2, the skirt 121 and the upper plate 122 of the front casing 120 define a front hollow interior area 141. Each of the interface buttons 161 is received in a port 163 extending through the operation array 160 (i.e., the upper plate 122 of the front casing 120) between the front hollow interior area 141 and an outside of the main body 110, via the open central portion 151 of the mask 150. The interface buttons 161 may be retained in the ports 163 by, for example, engaging protrusions 164 on the interface buttons 161 with grooves 165 in a corresponding port 163. The grooves 165 may receive and frictionally secure the protrusions 164 to prevent disengagement of the interface buttons 161. Alternatively, or in addition thereto, the interface buttons 161 may be retained within the ports 163 by known techniques such as, without limitation, positioning structures, compressive engagements, resilient supports, clips, straps, adhesives, and the like.

The interface 162 may be, in the exemplary embodiment shown in FIGS. 1 and 2, an opening positioned on, and extending through, the operation array 160 between the front hollow interior area 141 and the outside of the main body 110, via the open central portion 151 of the mask 150. The interface 162 is further described, below, with respect to its interaction with the circuitry of the smart furniture controller 100.

The back casing side walls 124 together define a back hollow interior area 142, and together the front hollow interior area 141 and the back hollow interior area 142 define a main body interior 143 when the front casing 120 and the back casing 130 are joined. As shown in the exemplary embodiment of FIG. 2, the back casing sidewalls 124 may be integrally formed, effectively as a single back casing sidewall 124. This disclosure is not limited to any number, configuration, or formation of the back casing sidewall(s) 124. In the assembled smart furniture controller 100, such as shown in FIG. 1, a circuit board 200 containing the control circuitry (discussed below) for the smart furniture controller 100 is received within the main body interior 143. Positioning blocks 210 are also received within the main body interior 143 and are configured for stabilizing and maintaining a position of the circuit board 200 in the main body interior 143. In addition, as shown in the exemplary embodiment of FIG. 2, the circuit board 200 is dimensioned such that a peripheral portion 201 of the circuit board 200 is sandwiched between the skirt 121 and the back casing sidewalls 124 when the front casing 120 and the back casing 130 are joined and the circuit board 200 is thereby secured in position within the main body interior 143.

In an aspect, each of the front casing 120, the back casing 130, and the circuit board 200 includes at least one connector receptacle 215 formed therein and configured for receiving a connecting structure such as a screw, dowel, rod, pin, bolt, clip, and the like for connecting any combination of the front casing 120, the back casing 130, and the circuit board 200 such that the smart furniture controller 100 may be fully and securely assembled. In the exemplary embodiment shown in FIG. 2, the complimentary dimensioning between the front casing 120, the back casing 130, and the circuit board 200 includes substantial alignment of the connector receptacles 215 through each of those components.

In a further aspect for securely assembling the smart furniture controller, connection teeth 216 extend upwardly from the top surfaces 125 of the back casing sidewalls 124 at positions where the circuit board 200, due to its shape, will not lie between the top surfaces 125 of the back casing sidewalls 124 and the bottom surface 123 of the skirt 121 when the front casing 120 and the back casing 130 are joined. The bottom surface 123 of the skirt 121 includes connection notches 217 dimensioned complimentarily to the connection teeth 216 and configured for receiving and retaining the connection teeth 216 therein. The connection notches 217 may retain the connection teeth 216 via frictional engagement, internal clips, or other known techniques.

Accordingly, in the exemplary smart furniture controller 100, the main body 110 includes, among other things, the front casing 120, the back casing 130, the circuit board 200, and the interface buttons 161. The front casing 120 and the back casing 130 are installed together in an opposite direction, forming the outer casing 140 of the exemplary embodiment. The circuit board 200 is set inside the outer casing 140. The interface buttons 161 are set in correspondence with the circuit board 200. In the exemplary embodiments, the front casing 120 is covered with the mask 150, and the main body 110 is equipped with the interface 162. The interface circuit, described below with respect to FIGS. 3 and 4, is disposed at the corresponding position of the circuit board 200.

With continuing reference to FIG. 2, the circuit board 200 includes, among other things, a plurality of operation buttons 220 and an interface conduit 230 positioned on the circuit board 200 such that when the circuit board 200 is positioned within the main body interior 143, one or more of the operation buttons 220 aligns with a corresponding interface button 161 and the interface conduit 230 aligns with the interface 162. In an aspect, the interface buttons 161 are positioned and dimensioned such that, when pushed, each interface button 161 (including each portion of an interface button 161—such as a first function portion 161a and a second function portion 161b—for separately controlling, e.g., volume up and volume down aspects) contacts a corresponding operation button 220 for transmitting to or initiating at a corresponding portion of a control circuit (FIGS. 3-5) a signal corresponding to the pushed button command, as described below with respect to FIGS. 3-5. The operation buttons 220 may therefore include, for example and without limitation, resilient mechanical aspects, as are known, for responsively making an electrical contact with the corresponding portions of the control circuit, and thereby generating the control signal, upon a user pushing the interface buttons 161. In an aspect, the assembly 100 may include one or more bushings 218 positioned for one or more of stabilizing the circuit board 200 against the front casing 120, bridging a gap between an operation button 220 and an interface button 161, insulating one or more portions of the circuit board 200, and the like. As described below, the control signal corresponding to the pushed button command may actuate a function or control of the smart furniture item.

The interface conduit 230 is positioned substantially between the interface 162 and the interface circuit, described below with respect to FIGS. 3 and 4, at the corresponding position of the circuit board 200. The interface conduit 230 defines an interface channel 235 extending therethrough. In an exemplary aspect, the interface 162 is configured for funneling sounds, such as voice commands from a user, into the channel 235, which directs the voice commands to a microphone 305 and a voice recognition module 320 (FIG. 3) as part of the exemplary voice recognition aspect of the smart furniture controller 100, as described below. However, in some embodiments, one or more interfaces may exist, alternatively or in addition, and without limitation, for providing an auxiliary connection such as a Universal Serial Bus (USB) or other auxiliary connection to the smart furniture controller 100 for connecting an auxiliary device such as a digital music player or smart device such as a smartphone, tablet, and the like.

Figure 3:
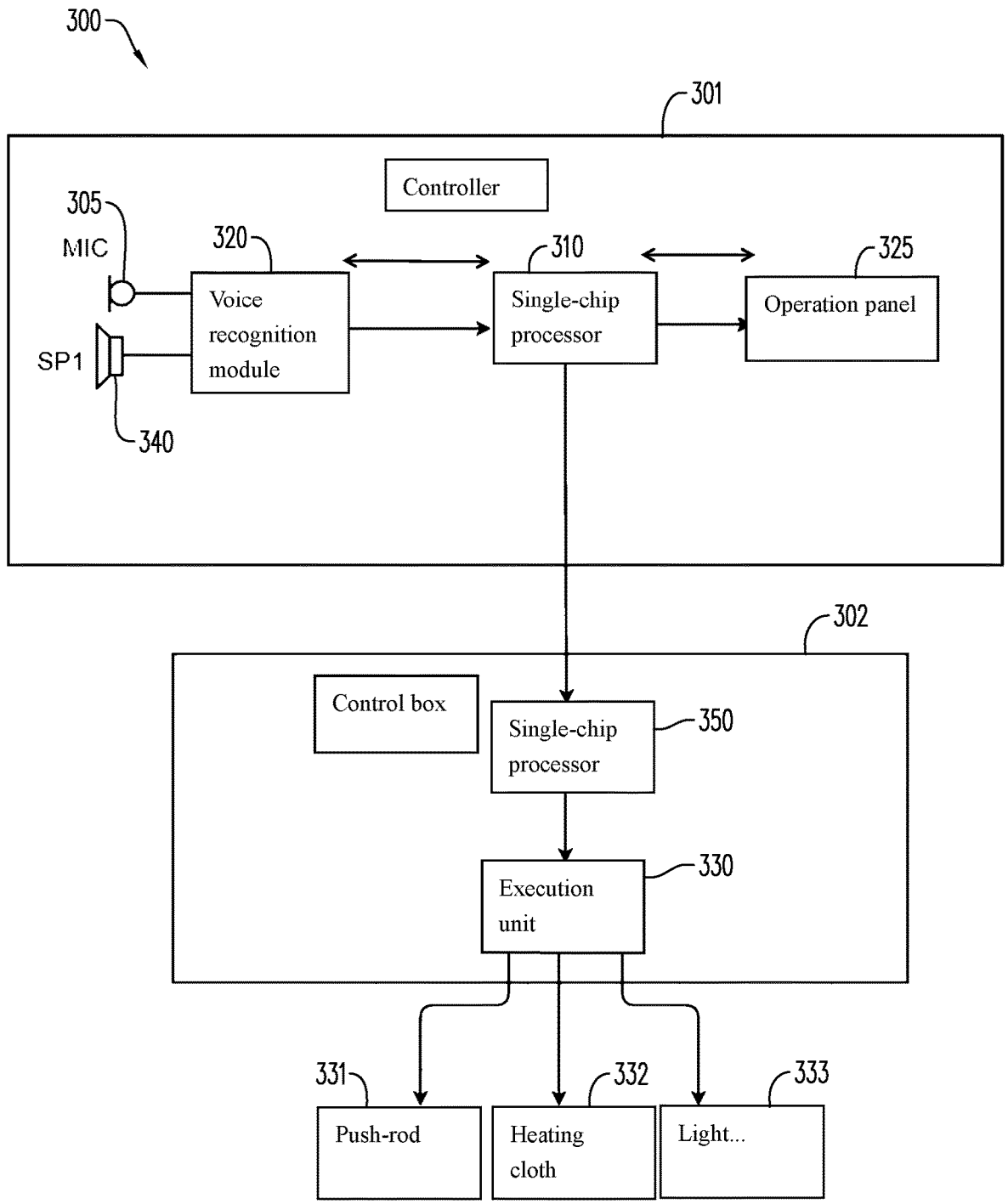
FIG. 3 is a circuit block diagram according to an embodiment.
Figure 4:
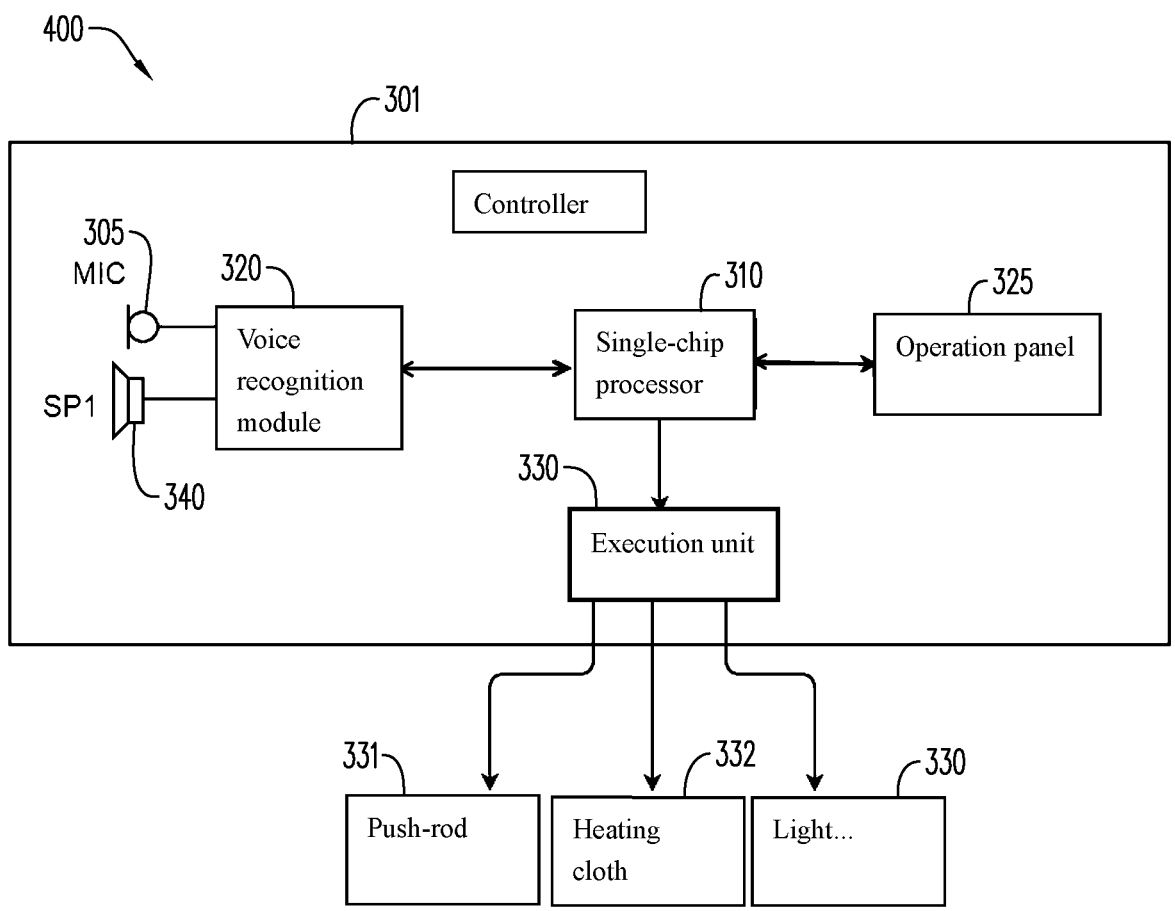
FIG. 4 is a circuit block diagram according to an embodiment.
Figure 11:
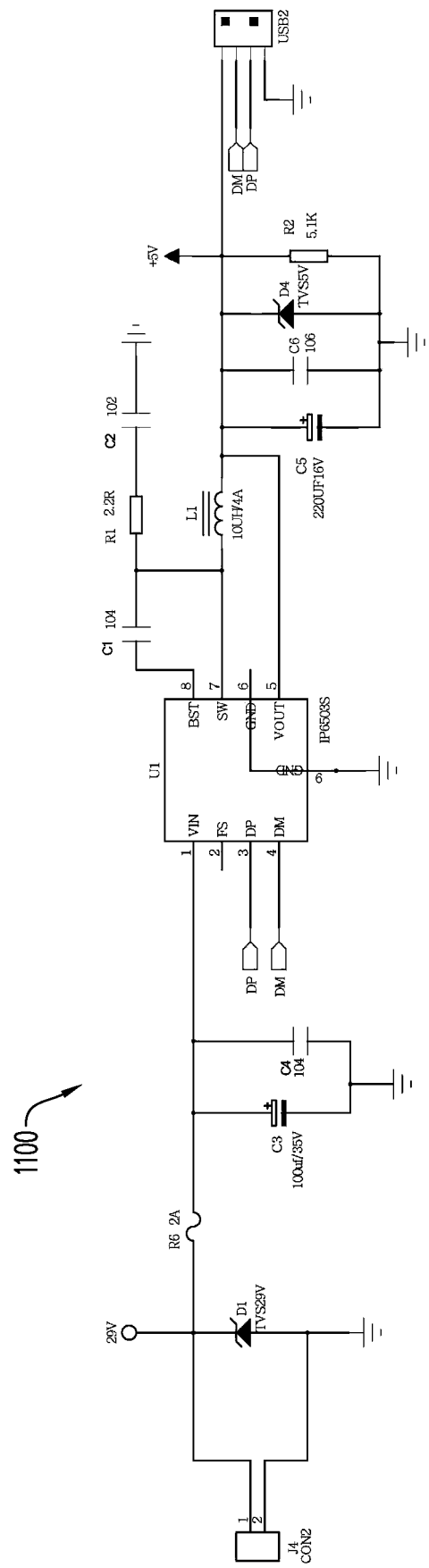
FIG. 11 is a circuit schematic diagram of a power module according to an embodiment.

With reference now to FIGS. 3 and 4, the exemplary smart furniture controller 100 includes a main body 110 and a control circuit 300, as previously discussed. The control circuit 300 is disposed in the main body 110, i.e., on the circuit board 200 within the main body interior 143. The exemplary control circuit 300 comprises a main control unit 310, a voice recognition module 320, an operation panel 325, a control output interface 330 ("Execution unit"), and a power module (FIG. 11). The voice recognition module 320 is connected to the main control unit 310; a microphone 305 is connected to the voice recognition module 320; the operation panel 325 is connected to the main control unit 310, and the control output interface 330 is connected to the main control unit 310. The power module is used to supply power.

The interface circuit, as discussed above, may be generally considered as including at least the microphone 305, the voice recognition module 320, and the main control unit 310 for receiving and processing voice or auxiliary signals. Every component of the interface circuit need not be located in the same area of the control circuit 300 on the circuit board 200—i.e., in correspondence with the interface 162. The corresponding position of the interface circuit to the interface 162 may refer only to a configuration in which, in an aspect, the microphone 305, the voice recognition module 320, and the main control unit 310 respectively receive the voice command and process and relay a signal based on the voice command. In various exemplary aspects, the main control unit 310 is responsible for coordinating the various command signals of the control circuit 300 for controlling functions of the smart furniture item. The main control unit 310 is in two-way communication with the voice recognition module 320 and the operation panel 325. As described below, the voice recognition module 320 is configured for recognizing a user's voice commands and transmitting a corresponding control signal to the main control unit 310. The operation panel 325 is configured for detecting, e.g., commands from interface buttons 161, via operation buttons 220, and transmitting corresponding control signals to the main control unit 310. In this embodiment, and with reference back to FIGS. 1 and 2, the operation buttons 220 are disposed on the operation panel 325, and the operation buttons 220 are thereby connected to the main control unit 310.

In an aspect, the main control unit 310 may send to one or both of the voice recognition module 320 and the operation panel 325 confirmation signals, programming updates, calibration commands, or other signals consistent with this disclosure.

In the exemplary embodiment shown in FIGS. 3 and 4, and with further reference to FIG. 6, the main control unit 310 may adopt a single-chip processor such as model SC92F7320. Other types of single-chip processors can also be selected according to actual needs. Each and every individual component and connection of the circuit 600a, 600b shown in FIGS. 5 and 6 and other circuit schematic diagrams (FIGS. 7-11) shown in the figures and referenced throughout this disclosure is not necessarily described but would be readily understood by a person having ordinary skill with the standard circuit/electrical wiring symbols and representations as illustrated in the schematics, in view of this disclosure.

Figure 8:
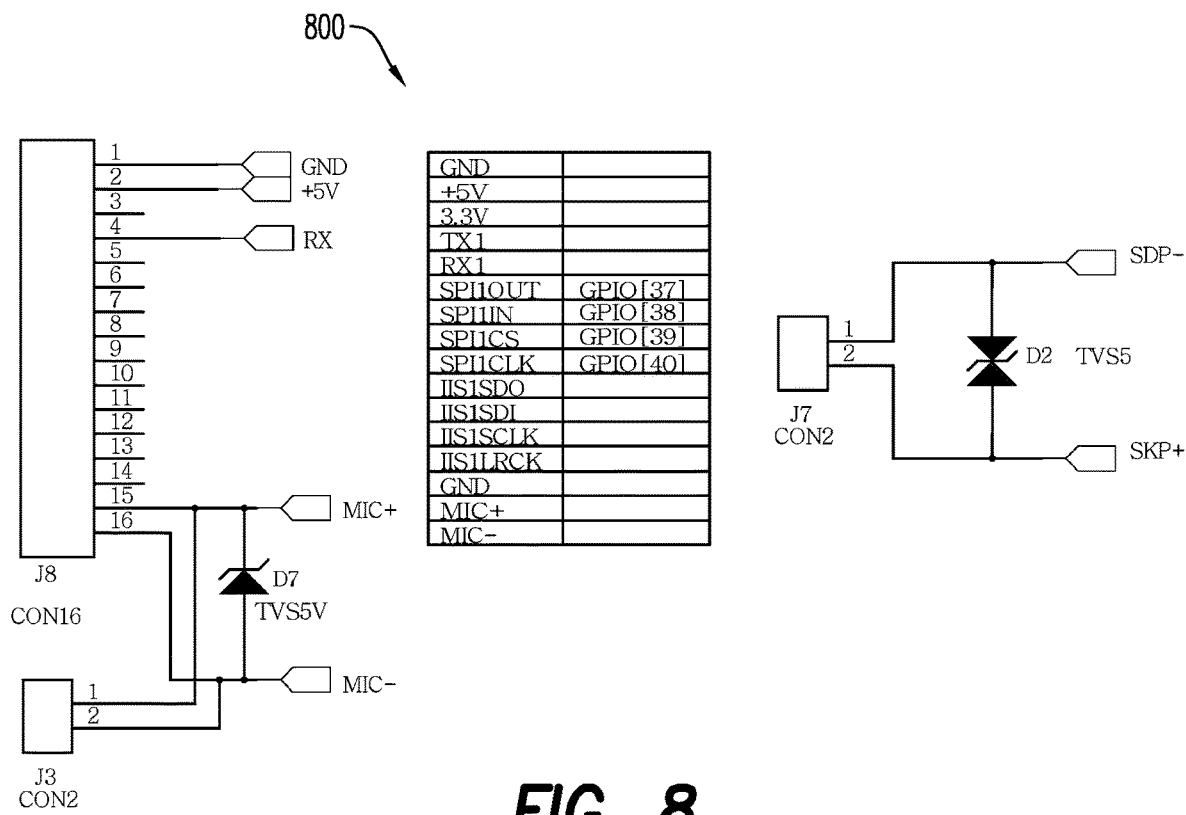
FIG. 8 is a circuit schematic diagram of a voice recognition interface according to an embodiment.

With continuing reference to FIGS. 3 and 4, and further reference to the voice recognition module circuit schematic 800 shown in FIG. 8, a TVS diode is connected to a microphone circuit (i.e., between MIC+ and MIC−) on the voice recognition module 320. A loudspeaker SP1 340 is connected to the voice recognition module 320 to output and broadcast the information recognized by the voice recognition module 320. A TVS diode is connected to the speaker circuit (i.e., between SKP+ and SKP−) on the voice recognition module 320. An exemplary intelligent voice chip that may be adopted includes model CI1006. Other types of voice chips can also be used according to actual needs. The TVS diodes connected to the microphone and speaker circuits on the voice recognition module 320 are 5V diodes.

In the exemplary embodiments, the control output interface 330 adopts a motor drive interface 1000 (FIG. 10), which uses a relay. A control coil of the relay is connected in series with a triode, the base of which is connected with the main control unit 310. The triode can be used as a switch. The main control unit 310 controls the triode to turn on or off; the triode controls the relay, and the relay controls a motor connected to the motor drive interface so as to carry out an actuator function 331. In an embodiment, the control output interface 330 also includes a heating pad control interface and a light control interface for respectively controlling a heating pad function 332 and a light control function 333. In various other embodiments, the control output interface 330 may include, without limitation, one or more interfaces for controlling one or more of an actuator (for a furniture or auxiliary component function), a massage function, an audio function such as playing an electronic audio file, a cup holder function such as heating, cooling, and/or lighting a cup holder, a charging function for providing power to an electronic device, a furniture function such as air conditioning, and the like.

In the exemplary embodiments, the power module 1100 (FIG. 11) may adopt the voltage converter U1 including model IP6503S. Because the internal device of the smart furniture uses the +29V power supply, the voltage converter converts the +29V power supply into a +5V power supply, supplying power to other circuit modules. A security fuse R6 is connected in series to the input end of the converter U1, and a TVS diode with a withstand voltage of 32V is connected to the front end of the fuse R6. The power module 1100 can also be powered by an external power source in this embodiment.

With reference now back to FIGS. 3 and 4, a monolithic and a split design are respectively shown according to the actual use conditions:

Embodiment 1: Refer to FIG. 3. In this embodiment, the control circuit 300 has a split design, which is divided into a controller main processor 301 and a control box 302. For purposes of this disclosure, the controller main processor 301 and the control box 302 may respectively be either a portion of the control circuit 300 disposed on the circuit board 200 and including the components of the controller main processor 301/control box 302 as described below, or a physical container for housing the components of the controller main processor 301/control box 302 and disposed, e.g., within the main body interior 143. The main control unit 310, the voice recognition module 320 and the operation panel 325 are disposed in the controller body of the controller main processor 301. The controller main processor 301 may be regarded as the host, and the control output interface 330 is set in the control box 302, which can be regarded as the client. An auxiliary control unit 350 is disposed in the control box 302 and can adopt a single-chip processor (its model can be the same to or different from that of the main control unit 310). The control output interface 330 is connected to the auxiliary control unit 350, which outputs control parameters to the control output interface 330. The main control unit 310 and the auxiliary control unit 350 are connected via a serial interface. The former outputs control signals to the latter, which outputs control parameters to the control output interface 330 so as to control the smart furniture. The auxiliary control unit 350 can store the control parameters for the next adjustment despite that this disclosure contemplates a separate memory function (e.g., by known electronic memory media) in some embodiments of a smart furniture controller.

Embodiment 2: Refer to FIG. 4. In this embodiment, the control circuit 300 has a monolithic design, i.e. all the function modules (the main control unit 310, the voice recognition module 320, the operation panel 325, and the control output interface 330) are integrated in a controller main processor 301.

Figure 5:
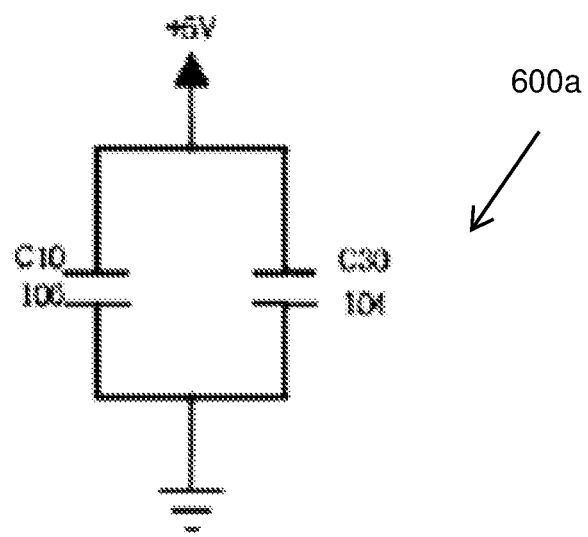
FIG. 5 is a circuit schematic diagram of a first portion of a main control unit according to an embodiment.
Figure 9:
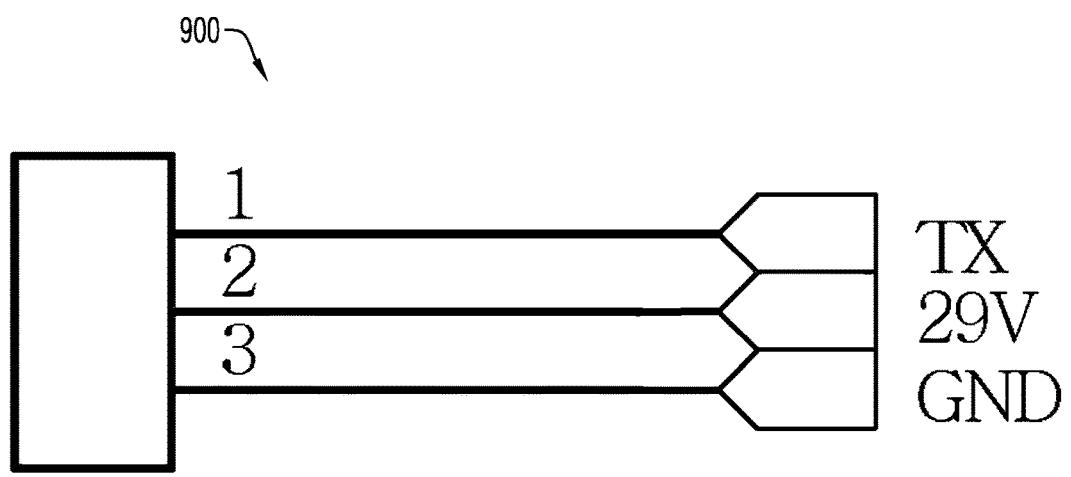
FIG. 9 is a circuit schematic diagram of a communication interface of a client processor according to an embodiment.
Figure 10:
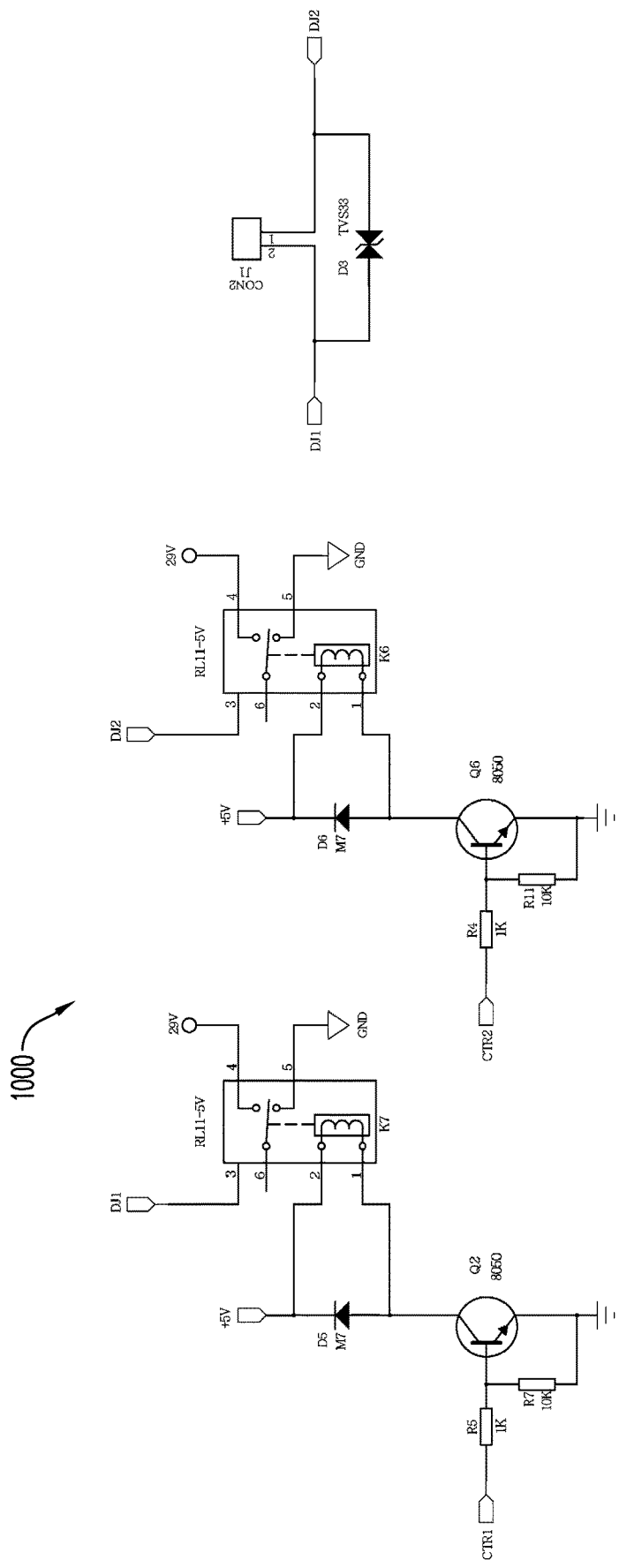
FIG. 10 is a circuit schematic diagram of a motor drive module according to an embodiment.

With reference now to FIGS. 5-11, circuit schematic diagrams illustrating the exemplary electronic components for use with the disclosed embodiments are shown. FIGS. 5 and 6 illustrate respective first and second portions of the main control unit 600a, 600b, FIG. 7 illustrates a button module 700, FIG. 8 illustrates the voice recognition interface 800, FIG. 9 illustrates a communication interface 900 of a client processor (e.g., auxiliary control unit 350), FIG. 10 illustrates the motor drive module 1000, and FIG. 11 illustrates the power module 1100.

In actual use, the disclosed embodiments may be installed in sofas, beds or other smart furniture, allowing the user to input control commands by voice or buttons to control the actuators, heaters, lights and other elements of the smart furniture. Accordingly, the exemplary embodiments of a smart furniture controller may allow for recognizing voice commands through the voice recognition module, thereby allowing a user to control the smart furniture directly through voice commands and making the operation simpler and more convenient.

The disclosed embodiments integrate a voice recognition module in the controller. Voice commands can be recognized through the voice recognition module, allowing to control the smart furniture via voice, and making the operation simpler and more convenient.

Turning now to FIGS. 12A-27, exemplary embodiments of a furniture fitting such as a furniture supporting leg having audio, function control, and/or phonetic recognition features and capabilities, and a furniture item incorporating such exemplary furniture fittings including the features and capabilities thereof, are disclosed according to further aspects of this disclosure. For purposes of this disclosure, "phonetic" generally means related to or constituting speech sounds and may be used interchangeably with "voice", without limitation to any particular type, medium, or source of a "voice".

Figure 12A:
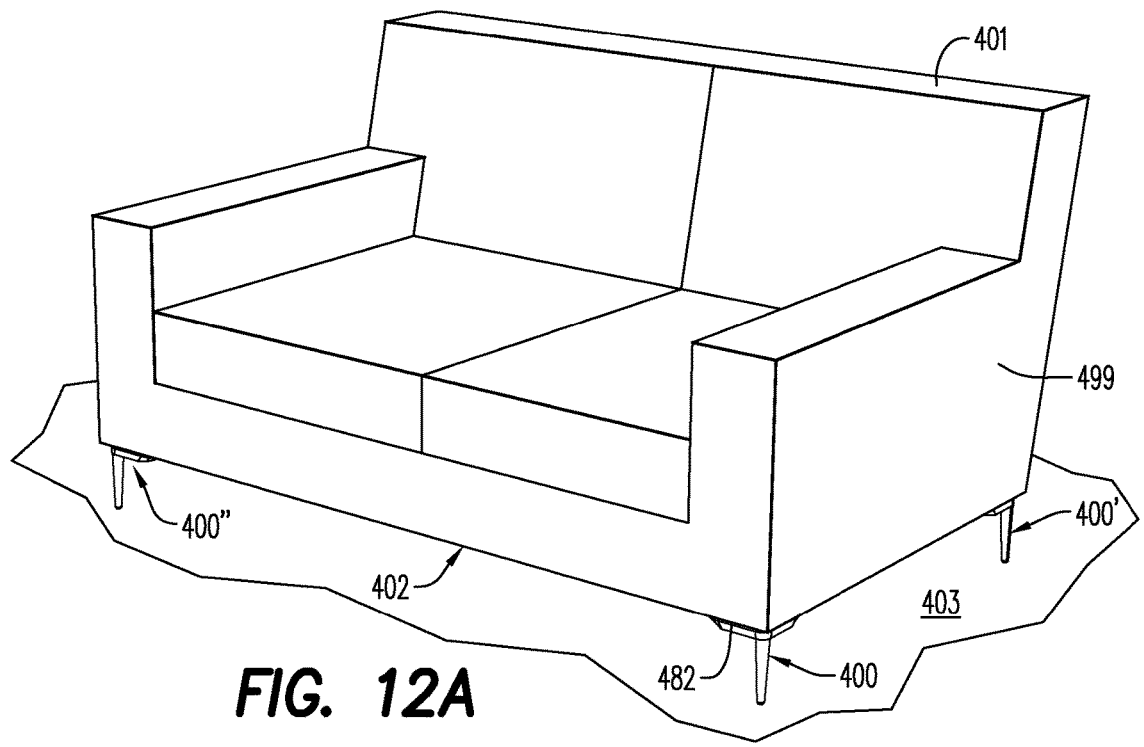
FIG. 12A is a perspective view of an exemplary furniture item including supporting audio elements according to exemplary embodiments.
Figure 12B:
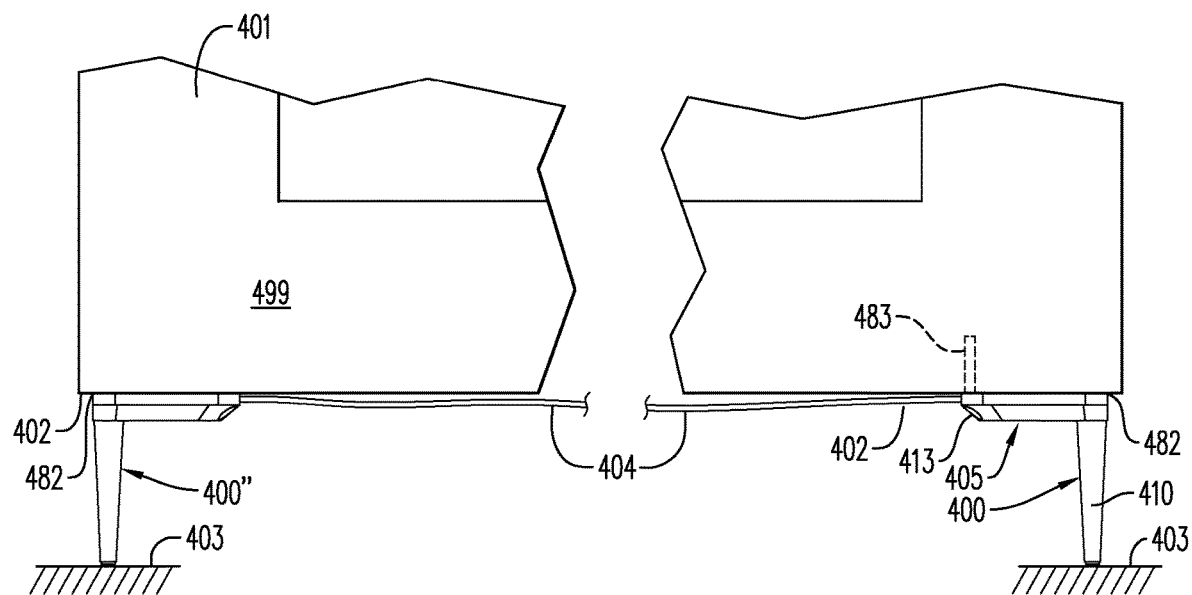
FIG. 12B is a rear view of an exemplary furniture item including supporting audio elements according to exemplary embodiments.

To overcome the need for furniture with integrated functions based on existing technology, this disclosure relates generally to a supporting audio element for a furniture item and, more specifically, describes exemplary embodiments of a supporting audio leg 400 that may include, among other things, audio playing and voice recognition functions and operability. As shown in FIGS. 12A-12B, for example, the exemplary supporting audio leg 400 may be positioned and serve to support the furniture item 401 in the same manner as a conventional furniture leg, although this disclosure is not limited to any particular placement of the supporting audio leg 400, nor should the phrase "supporting audio leg" otherwise limit the exemplary embodiments of a "furniture fitting" or "supporting audio element" consistent with this disclosure.

In the exemplary embodiments shown in FIGS. 12A and 12B, the exemplary supporting audio leg 400 is shown in use with a sofa, although the exemplary embodiments of a supporting audio element according to this disclosure may be used without limitation on a variety of furniture items consistent with this disclosure, including chairs, beds, dressers, tables, TV cabinets, and the like. The furniture item 401 may include a furniture item body 499 including a bottom surface 402 and a supporting element/leg connecting portion 482 on the bottom surface 402. A main supporting audio leg 400 may include a body portion 405 mounted to the supporting leg connecting portion 482 and a leg portion 410 (or, "supporting post 410" according to its function) connected to and extending away from the body portion 405, to a ground surface 403. The main supporting audio leg 400 may be mounted to the supporting leg connecting portion 482 by, without limitation, a fastener (not shown) extending through a mounting aperture 413 through the body portion 405 and received in a supporting element connection 483. The fastener may be, for example and without limitation, a threaded fastener that threadingly connects to the supporting element connection, or the fastener or other connection may be any known component or technique consistent with this disclosure.

In the exemplary embodiments shown in FIGS. 12A and 12B, the furniture item includes secondary supporting audio legs 400', 400" for, e.g., receiving and playing an audio signal from the main supporting audio leg 400 as will be explained below. A basic external structure of the second supporting audio legs 400', 400" may be generally the same as the main audio leg 400, as may be the connection between the secondary audio legs 400', 400" and additional supporting leg connecting portions 482 on the furniture item. The main audio leg 400 may be connected to one or more of the secondary supporting audio legs 400', 400" by a physical connection such as, without limitation, an interconnect wire 404, or may communicate wirelessly with the secondary supporting audio legs 400', 400" by, e.g., radio frequency (RF) communication.

Figure 13:
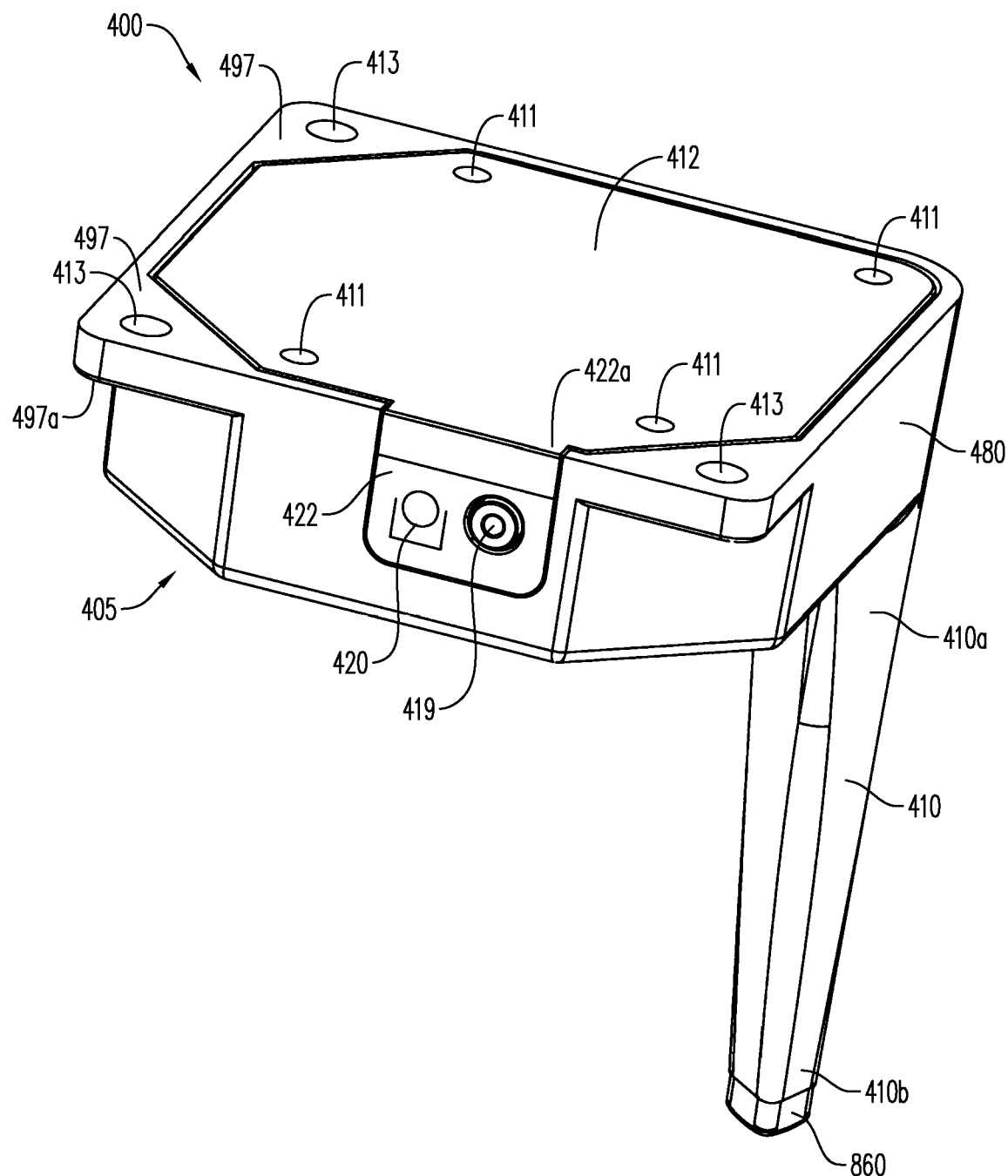
FIG. 13 is a perspective view of a supporting audio element according to an exemplary embodiment.
Figure 14:
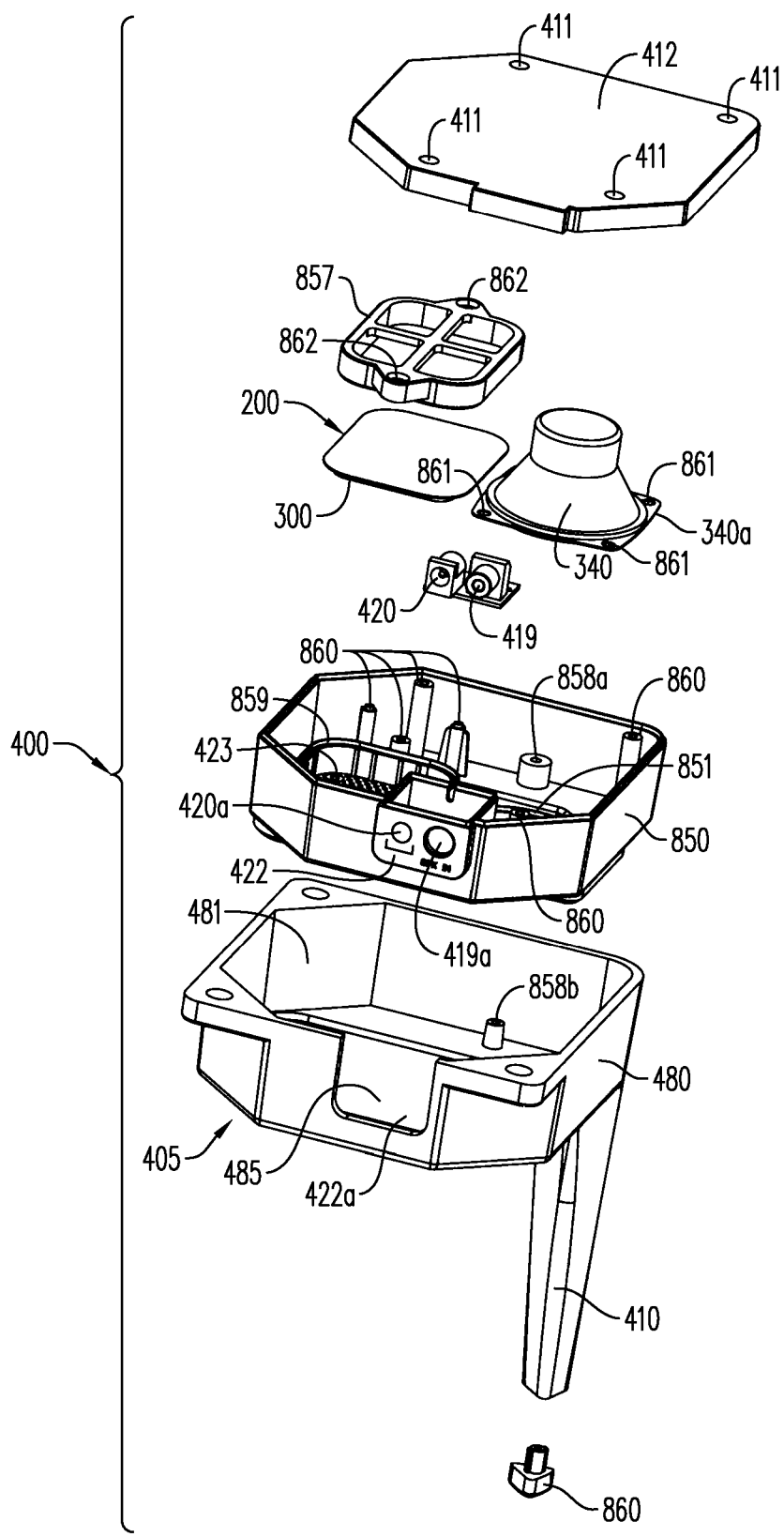
FIG. 14 is an exploded view of the exemplary supporting audio element of FIG. 13.
Figure 15:
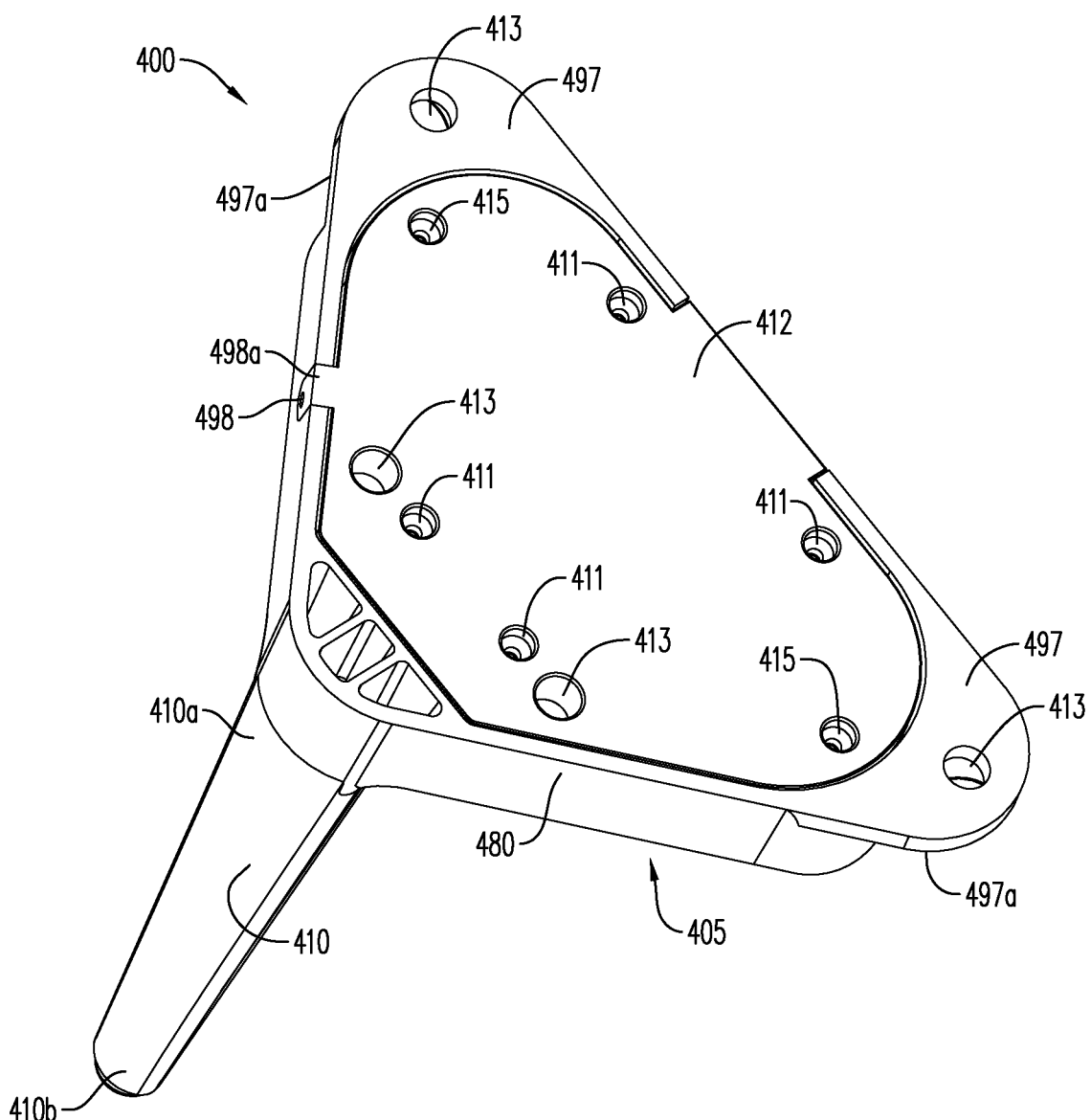
FIG. 15 is a perspective view of a supporting audio element according to an exemplary embodiment.
Figure 16:
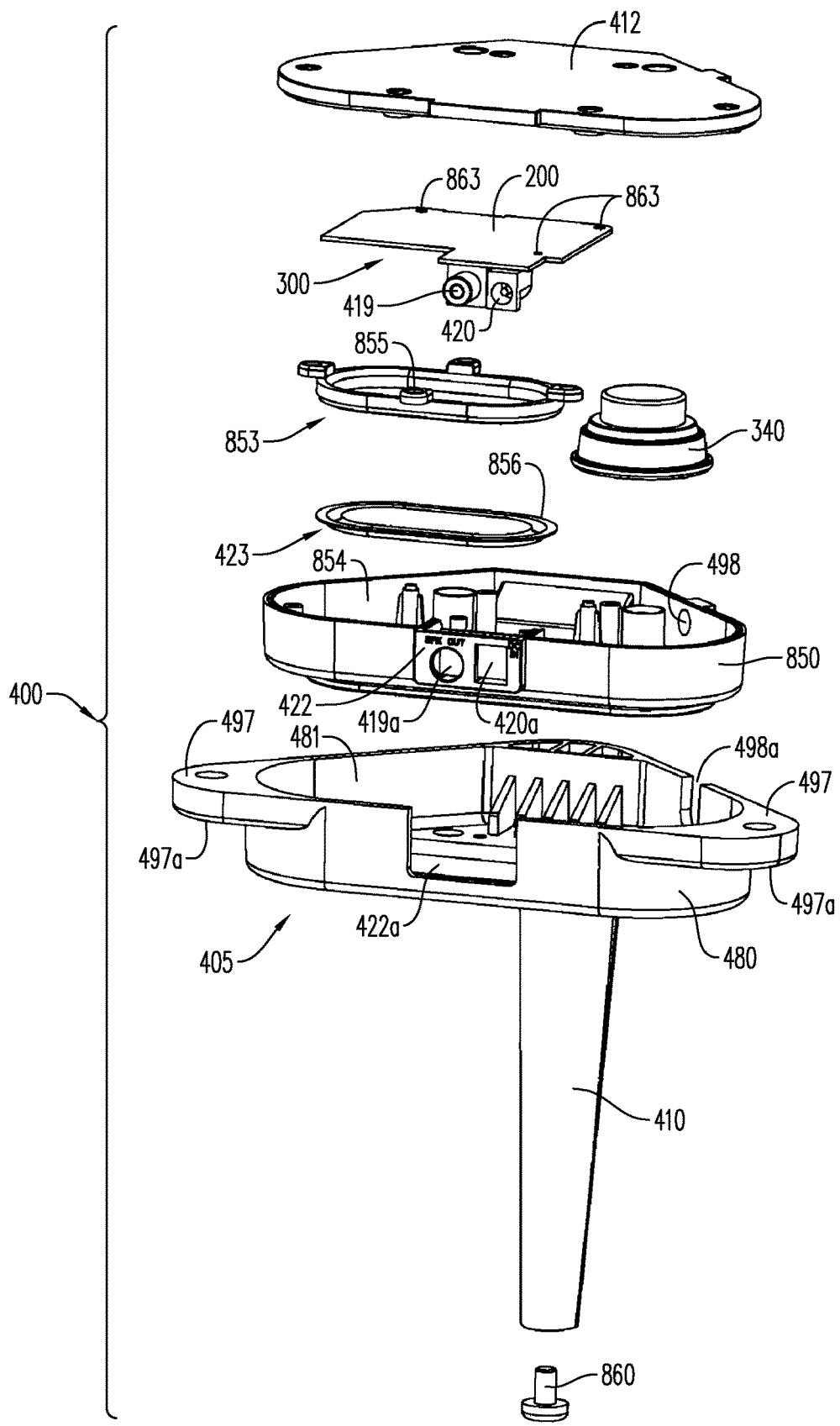
FIG. 16 is an exploded view of the exemplary supporting audio element of FIG. 15.
Figure 17:
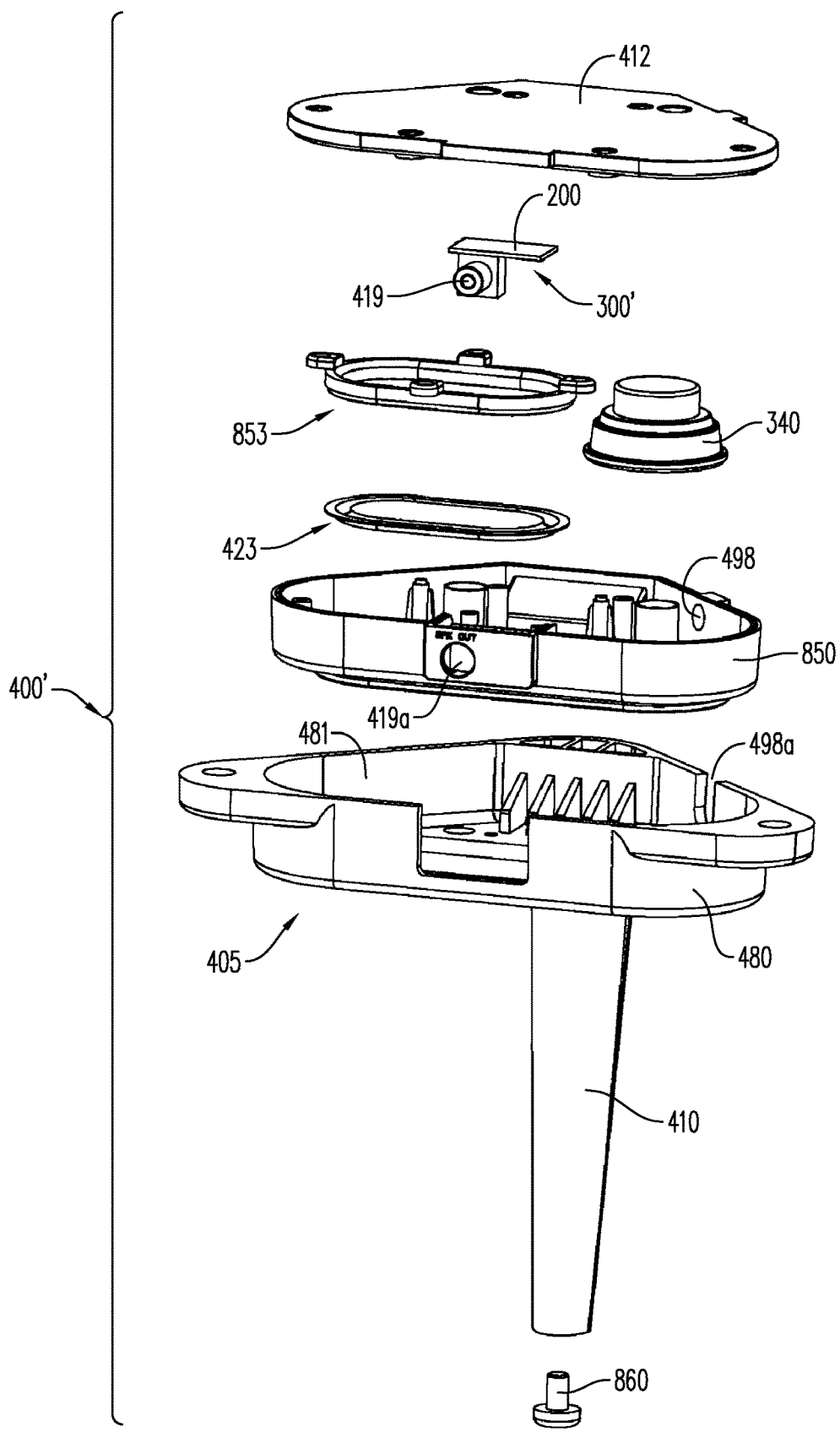
FIG. 17 is an exploded view of a supporting audio element according to an exemplary embodiment.

With reference now to FIGS. 13-17, general structures and configurations of exemplary supporting audio legs 400 are shown. FIGS. 13 and 14 illustrate an exemplary supporting audio leg 400 having a generally square shaped body portion 405. FIGS. 15-17 illustrate an exemplary supporting audio leg 400 having a generally triangularly shaped body portion 405. The general shape of a supporting audio leg 400 according to this disclosure is not limited to those illustrated in the exemplary embodiments but may take any shape as particular applications and preferences require.

Generally, the exemplary supporting audio leg 400 may include the body portion 405 including a body portion housing 480, and the body portion housing 480 defining an interior area 481 of the body portion 405. A supporting post 410 may include a first end 410a and a second end 410b opposite the first end 410a and be connected at the first end 410a to the body portion housing 480 and extend away from the body portion housing 480 towards the second end 410b. A loudspeaker 340 may be positioned within the interior area 481 of the body portion 405 along with, without limitation, a control circuit 300 that may include, for example, a microcontroller U1, and a wireless radio frequency (RF) antenna ANT electrically connected to the microcontroller U1. The loudspeaker 340 may be electrically connected to the microcontroller U1, the microcontroller U1 and the RF antenna together may be configured for wireless data communication with an external audio device, and the microcontroller U1 and the loudspeaker 340 together may be configured for playing audio data received by the RF antenna and the microcontroller U1. The loudspeaker 340 may be positioned adjacent a speaker opening 485 in the body portion housing 480. The external audio device may be, without limitation, a media storage device or player or a secondary supporting audio leg 400'.

In various exemplary embodiments, the control circuit 300 may be positioned within the interior area 481 of the body portion 405 and include a phonetic recognition module 320 and an audio processing and controlling module 810 electrically connected to the phonetic recognition module 320, and a microphone 305 electrically connected to the phonetic recognition module 320. The microphone 305 may be configured for receiving a speech signal and relaying the speech signal to the phonetic recognition module 320, the phonetic recognition module 320 may be configured for recognizing a voice command in the speech signal and relaying the voice command to the audio processing and controlling module 810, and the audio processing and controlling module 810 may be configured for controlling a function responsive to the voice command. The function may be one of, without limitation, playing audio through the loudspeaker 340 and controlling stop/start function, volume levels, and the like, adjusting a position of a component of the furniture item 401, activating a heater or a cooler in the furniture item 401, turning on a light source, and activating a massager. The control circuit 300 may further include an execution unit 330 electrically connected to the audio processing and controlling module 810 and configured for electrically connecting to an actuator on the furniture item 401, and the audio processing and controlling module 810 may be configured for transmitting a control signal to the execution unit 330 and the execution unit 330 may be configured for controlling the actuator, based on the control signal.

The body portion housing 480 may include one or more first mounting apertures 413 through a first wall 407 of the body portion housing 480 and one or more second mounting apertures 413 through a second wall 408 of the body portion housing 480, and the first mounting apertures 413 and the second mounting apertures 413 may be positioned to align with respective supporting element connections 483 on the furniture item, adjacent the second mounting apertures 413.

In various exemplary embodiments of a furniture item 401 including a main supporting audio leg 400 and a secondary supporting audio leg 400' connected by the interconnect wire 404, the interconnect wire 404 may be in electrical communication with the control circuit 300 (and/or the microcontroller U1 which may be a component of the control circuit 300) of the main supporting audio leg 400 and configured for relaying audio signals from the control circuit 300/microcontroller U1 to a loudspeaker input connection 419 on the secondary supporting audio leg 400'. The furniture item 401 may include the furniture item body 499 including the bottom surface 402 and the first supporting leg connecting portion 482 on the bottom surface 402, and the main supporting audio leg 400 including a body portion 405 mounted to the first supporting leg connecting portion 482 and a leg portion 410 connected to and extending away from the body portion 405. The furniture item 401 may further include the secondary supporting audio leg 400' including a body portion 405 mounted to a second supporting leg connecting portion 482 and a leg portion 410 connected to and extending away from the body portion 405 of the secondary supporting audio leg 400'. The body portion 405 of the secondary supporting audio leg 400' may include a body portion housing 480 defining an interior area 481 of the body portion 405 and a loudspeaker 340' may be positioned within the interior area 481 of the body portion 405 of the secondary supporting audio leg 400' and electrically connected to an RF receiver. The RF receiver of the secondary supporting audio leg 400' may be configured for receiving audio data from the main supporting audio leg 400 by, e.g., RF transmission from an RF antenna in the main supporting audio leg 400, and the loudspeaker 340' of the secondary supporting audio leg 400' may be configured for playing audio data received by the RF receiver of the secondary supporting audio leg 400'.

The furniture item 401 may further include an actuator 841, 842, 843, 844 for controlling a furniture function, and the control circuit 300 of the main supporting audio leg 400 may include an execution unit 330, and the actuator 841, 842, 843, 844 may be electrically connected to and controlled by the execution unit 330.

In certain exemplary embodiments, a mounting plate 490 may be positioned respectively between one or more of the body portion 405 of the main supporting audio leg 400 and the first supporting leg connecting portion 482 and one or more secondary supporting audio legs 400', 400" and the second/a third, etc. supporting leg connecting portion(s) 482, and mounted to the supporting leg connecting portion(s) 482. In certain exemplary embodiments, the respective body portion 405 of the main supporting audio leg 400 and any secondary supporting audio legs 400', 400" may include a mounting port 418, and the leg portion 410 may be removably connected to the mounting port 418 and interchangeable with an alternate leg portion. The leg portion 410, i.e., supporting post 410, may include an attachment post 416 formed as a portion of the supporting post 410 or as, without limitation, a bolt or other fastener extending away from a mounting end surface 417 on the first end 410a of the supporting post 410 in a direction away from the second end 410b of the supporting post 410. In an aspect, the attachment post 416 may include an external threaded portion 427 sized complimentarily to an internal threaded portion 428 of the mounting port 418, and the mounting port 418 may be configured for receiving and threadingly connecting to the attachment post 416. A thread size of the attachment post may be one of ⅜"-16 and 5/16"-18.

With continuing reference to FIGS. 13-17 and the exemplary embodiments shown therein, the exemplary supporting audio leg 400 generally includes a body portion 405 and a supporting post 410 connected at a first end 410a to the body portion 405 and extending away from the body portion 405 in a direction towards a second end 410b of the supporting post 410, opposite the first end 410a. A padding leg 860 may be attached to the second end 410b of the supporting post 410, to increase friction with the ground surface 403 and improve stability of the supporting audio leg 400.

The body portion 405 includes a body portion housing 480 which may be an integrally formed structure or may include several different portions and/or structures as described further below. For purposes of this disclosure, "integral" or "integrally" means a single piece or formed as a single piece. The supporting post 410 may be formed integrally with the body portion housing 480 or may be connected or attached thereto by any known techniques. For purposes of this disclosure, "body portion" generally refers to the portion of the supporting audio leg 400 that is connected to the supporting post 410 and contains the electronic and other internal components as described in the exemplary embodiments, and is not limited to any particular structure or combination of structures such as those that may constitute the body portion housing 480. The "body portion housing" generally includes all of the structures, in any combination, configuration, or arrangement, for defining the interior area 481 of the body portion 405 in which the internal components may be positioned according to the various exemplary embodiments. Phrases such as "body portion" and "body portion housing" are provided to aid in the description of the exemplary embodiments and not as a limitation thereto, e.g., with respect to any particular delineations, feature sets, or arrangements. In an aspect, exemplary constructions a body portion housing 480 according to certain exemplary embodiments are described below, but not limited thereto.

In the exemplary embodiments shown in FIGS. 13-17, a portion of the body portion housing 480 is a blind flange 412, interchangeably referred to herein for ease of reference as a removable panel 412 that closes off a top portion of the body portion 405 to enclose the electronic and other components within the interior area 481 of the body portion 405. Panel securement apertures 411 are provided for securing the removable panel 412 to one or more other components of the body portion housing 480 or therewithin, with, for example, screws or fasteners. With specific reference to FIGS. 15-17, the removable panel 412 may also include body portion interior apertures 415 for securing specifically internal components of the body portion 405 to the removable panel 412, with, for example, screws or fasteners.

The body portion housing 480 includes mounting apertures 413 therethrough, for mounting the supporting audio leg 400 to the furniture item 401 with, for example and without limitation, screws or fasteners, as previously discussed. In the exemplary embodiments shown in FIGS. 13-17, certain mounting apertures 413 are formed through extended connecting areas 497 of the body portion 480 that form an overhang 497*a* through which the mounting apertures 413 are formed.

A portion of the body portion housing 480 may be configured as an interface panel cutout 422*a* for accommodating an interface panel 422 including, e.g., an interconnect port 419 for connection to an external audio device or secondary supporting audio leg 400', 400" and a power supply/input port 420 for receiving a power supply from, e.g., a wall outlet and/or power adapter.

With reference now to FIG. 14, an exploded view of the exemplary supporting audio leg 400 shown in FIG. 13 is illustrated. As shown in the exemplary configuration of FIG. 14, a loudspeaker 340 for playing audio is positioned within the interior area 481 of the body portion 405. A circuit board 200 carries a control circuit 300 and is positioned on a frame 857 and within an interior area 854 of a carriage 850 that is positioned or housed within the interior area 481 of the body portion 405. The interconnect port 419 and the power supply/input port 420 are also positioned within the carriage 850, accessible respectively through an interconnect port aperture 419*a* and a power supply/input port aperture 420 through the interface panel 422, and electrically connected to the circuit board 200, e.g., through connecting wire 859.

Internal carriage connections 860 on the carriage 850, within the interior area 854 of the carriage 850, are positioned for receiving the fasteners through the panel securement apertures 411 to secure the carriage 850 to the removable panel 412. Carriage to body connecting aperture 858*a*, 858*b* are respectively positioned within the interior area 854 of the carriage 850 and the interior area 481 of the body portion 405, for connecting the carriage 850 to the body portion housing 481 by, e.g., a screw or fastener.

Similarly, internal loudspeaker connections 861 on a loudspeaker frame 340*a* connected to the loudspeaker 340 are positioned for securing the loudspeaker frame 340*a* and loudspeaker 340 to the carriage 850, and circuit board frame connections 862 on the circuit board frame 857 are positioned for securing the circuit board frame 857 to the removable panel 412 and/or the carriage 850, at the corresponding panel securement apertures 411 and/or the internal carriage connections 860.

As will be discussed further below, the carriage 850 includes a hole 851 therethrough and the body portion housing 480 includes a speaker opening 485 therethrough, and the hole 851 through the carriage 850 is aligned with each of the speaker opening 485 through the body portion housing 480 and the loudspeaker 340 such that sound from the loudspeaker 340 may travel out of the body portion 405 and be projected into the environment. A speaker grill 423 is positioned in the hole 851 through the carriage 850 adjacent the loudspeaker 340 and protects the loudspeaker 340 and other components with the interior area 481 of the body portion 405 from dirt and other materials.

An exploded view of the exemplary supporting audio leg 400 shown in FIG. 15 is illustrated in FIG. 16. As previously discussed with respect to FIG. 14, the exemplary configuration shown in FIG. 16 includes, among other things, a carriage 850 positioned within the internal area 481 of the body portion housing 480 and including an internal area 854 of the carriage 850 in which a circuit board 200 containing a control circuit 300 is housed along with a loudspeaker 340 and an interconnect port aperture 419*a* and a power supply/input port aperture 420 accessible through an interface panel 422 and interface panel cutout 422*a*. The circuit board 200 may include circuit board connectors 863 for securing, e.g., by screws or fasteners, to the removable panel 412 or carriage 850 in a manner as discussed with respect to other internal components. In the exemplary embodiment shown in FIG. 16, loudspeaker 340 may be installed on the circuit board 200 according to known techniques. An optional port 498 may be formed through the carriage 850 and accessible via an optional port cutout 498*a* in the body portion housing 480, to allow for, e.g., an additional interconnection between the control circuit 300 and a secondary supporting audio leg 400', 400" or other device. Other features regarding the connections between various components are fundamentally the same as discussed with respect to FIG. 14 and, for brevity, will not be repeated here.

As shown in FIG. 16, the speaker grill 423 is held in place by a speaker grill retainer 853 that is an annular component sized to sandwich a perimeter 856 of the speaker grill 852 between the speaker grill retainer 853 and the carriage 850, within a hole (not shown in FIG. 16) through the carriage 850 that aligns with a speaker opening 485 through the body portion housing 480. The speaker grill retainer 853 connects to the carriage 850 to secure the speaker grill 852 in place. In the exemplary embodiment shown in FIG. 16, the speaker grill retainer 853 includes screw ports 855 for accepting a screw or fastener therethrough, the screw or fastener extending through the screw ports 855 and connecting to complimentary ports on the carriage 850. In alternative embodiments, the speaker grill retainer 853 may connect to the carriage 850 and/or the body portion housing 480 by any technique consistent with this disclosure.

With reference now to FIG. 17, an exploded view of an exemplary secondary supporting audio leg 400' is shown. The structure and configuration generally follows that of the exemplary supporting audio leg 400 shown in FIG. 16; however, as further discussed below, a circuit interface 300' for the secondary supporting audio leg 400' is limited to components for receiving and playing, through the loudspeaker 340', audio signals from a "main" supporting audio leg 400, such as the supporting audio leg 400 shown in FIG. 16. Optional port 498 is provided for relaying the signal received (at interconnect port 419) from the main supporting audio leg 400 to an additional secondary audio leg 400".

In various exemplary embodiments according to this disclosure, a supporting audio leg 400 may include one or more of the functions described herein, alone or in various combinations as particular applications dictate. For example, an exemplary supporting audio leg 400 may be configured for one or more of, without limitation, communicating with an external audio device, playing audio, controlling a function of the furniture item, voice recognition, and voice control. The exemplary circuit configurations and functions as described herein are not limiting and may correspond to the particular functions and features incorporated in a particular exemplary embodiment of a supporting audio leg 400.

Figure 29:
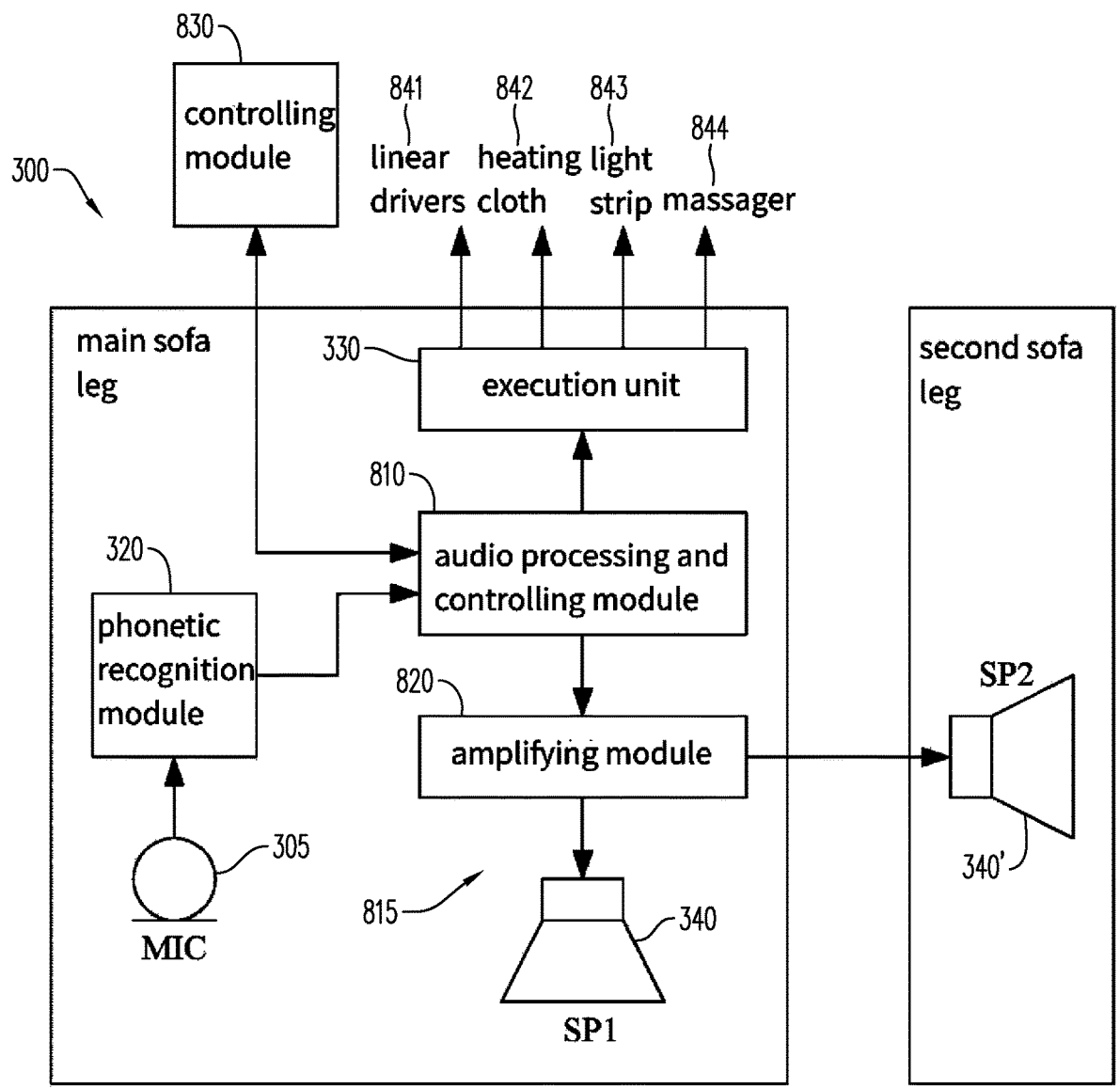
FIG. 29 is a block circuit diagram according to an exemplary embodiment.
Figure 33:
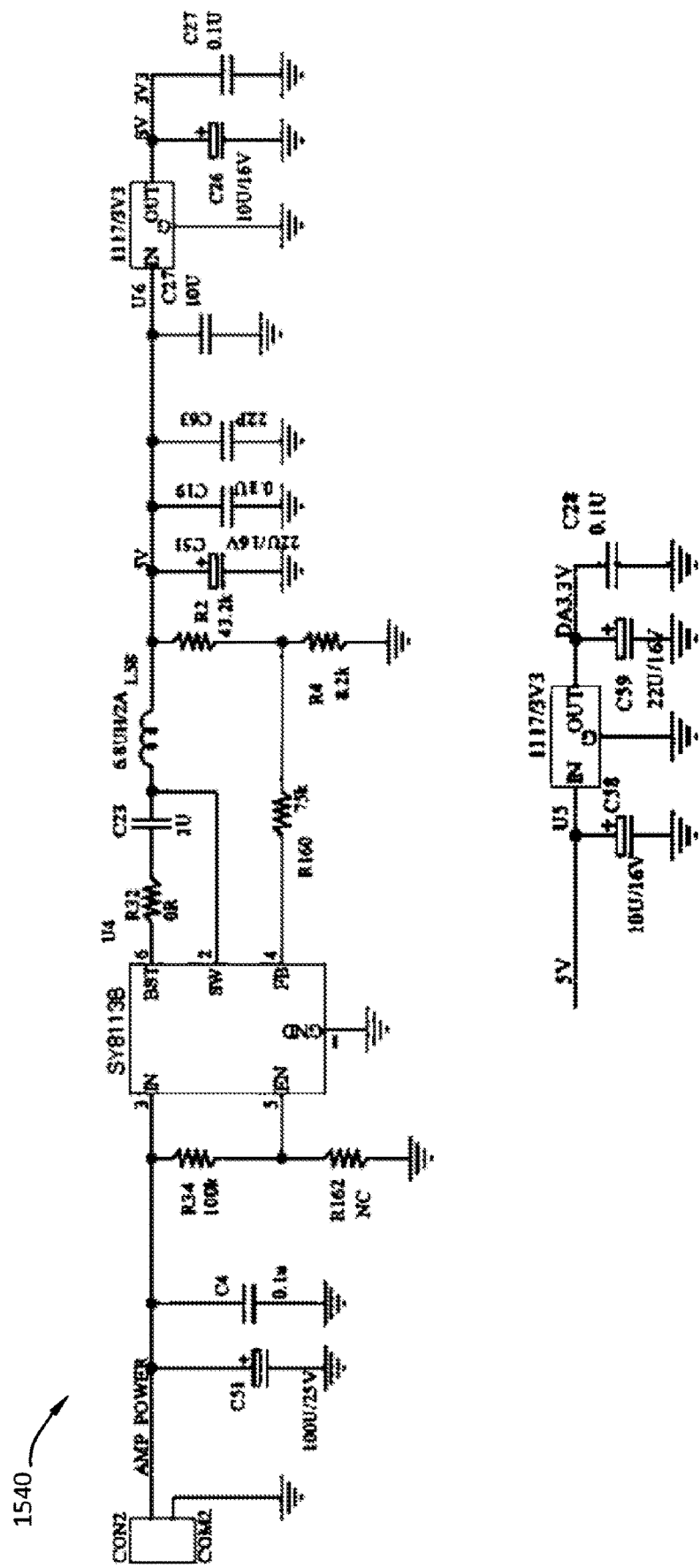
FIG. 33 is a circuit schematic diagram of a power module according to an embodiment.

With reference now to FIG. 29, in certain exemplary embodiments incorporating voice recognition and control a phonetic recognition module 320 and/or an audio processing and controlling module 810 may be set inside the supporting audio leg 400 as part of the control circuit 300 and operative for, without limitation, voice recognition and audio playing and function control, and the like, based on voice commands received and recognized by the phonetic recognition module 320 and/or audio processing and controlling module 810. Furthermore, in the exemplary embodiments, particularly include internal components such as those mentioned above, among others, may be hidden inside the supporting audio leg 400, which makes the furniture more harmonized. Thus, the exemplary embodiments of a supporting audio leg 400 according to this disclosure may include a body portion 405 and a control circuit 300 installed in it. The control circuit 300 may include the audio processing and controlling module 810, a sound unit 815, the phonetic recognition module 320, and a power module 1540 (FIG. 33) installed on the control circuit 300, e.g., as portions of the control circuit 300. The sound unit 815 in the exemplary embodiment shown in FIG. 29 is connected to the audio processing and controlling module 810, with an amplifier 820 installed on it. The voice recognition module 320 is connected to the audio processing and controlling module 810, with a microphone 305 installed on it. The power module 1540 is used to supply power. An external controlling module 830 may be connected to the audio processing and controlling module 810 to control additional furniture functions based on control signals provided by the audio processing and controlling module 810.

As previously discussed, each and every individual component and connection of the circuits shown in, e.g., FIGS. 29-33 is not necessarily described but would be readily understood by a person having ordinary skill with the standard circuit/electrical wiring symbols and representations as illustrated in the schematics, in view of this disclosure. Where particular microchips, interconnects, ports, or other circuit components are specified, this disclosure is not limited thereto but encompasses other circuit components and configurations consistent with this disclosure.

Figure 30:
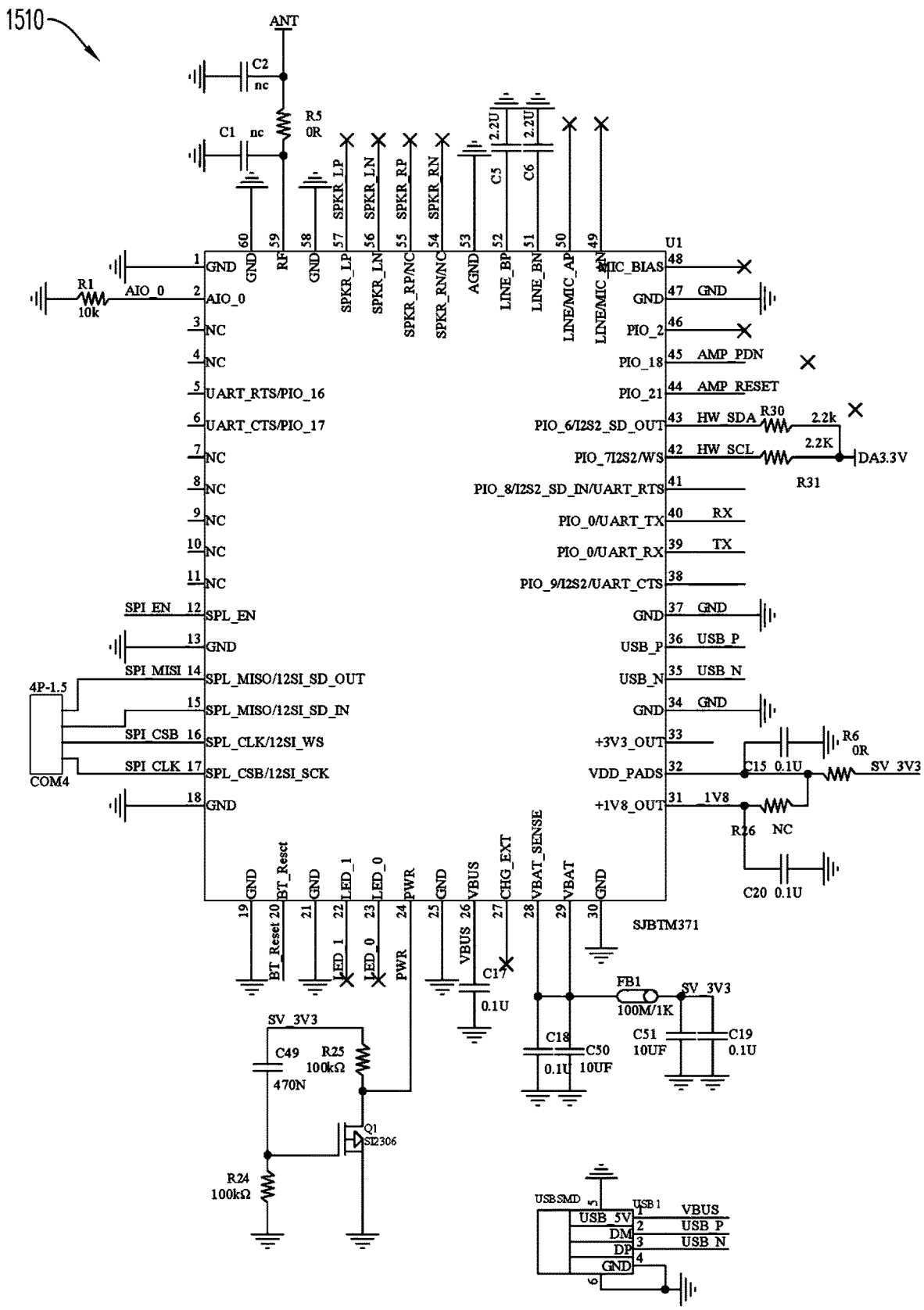
FIG. 30 shows an audio processing and controlling module circuit diagram according to an exemplary embodiment.
Figure 31:
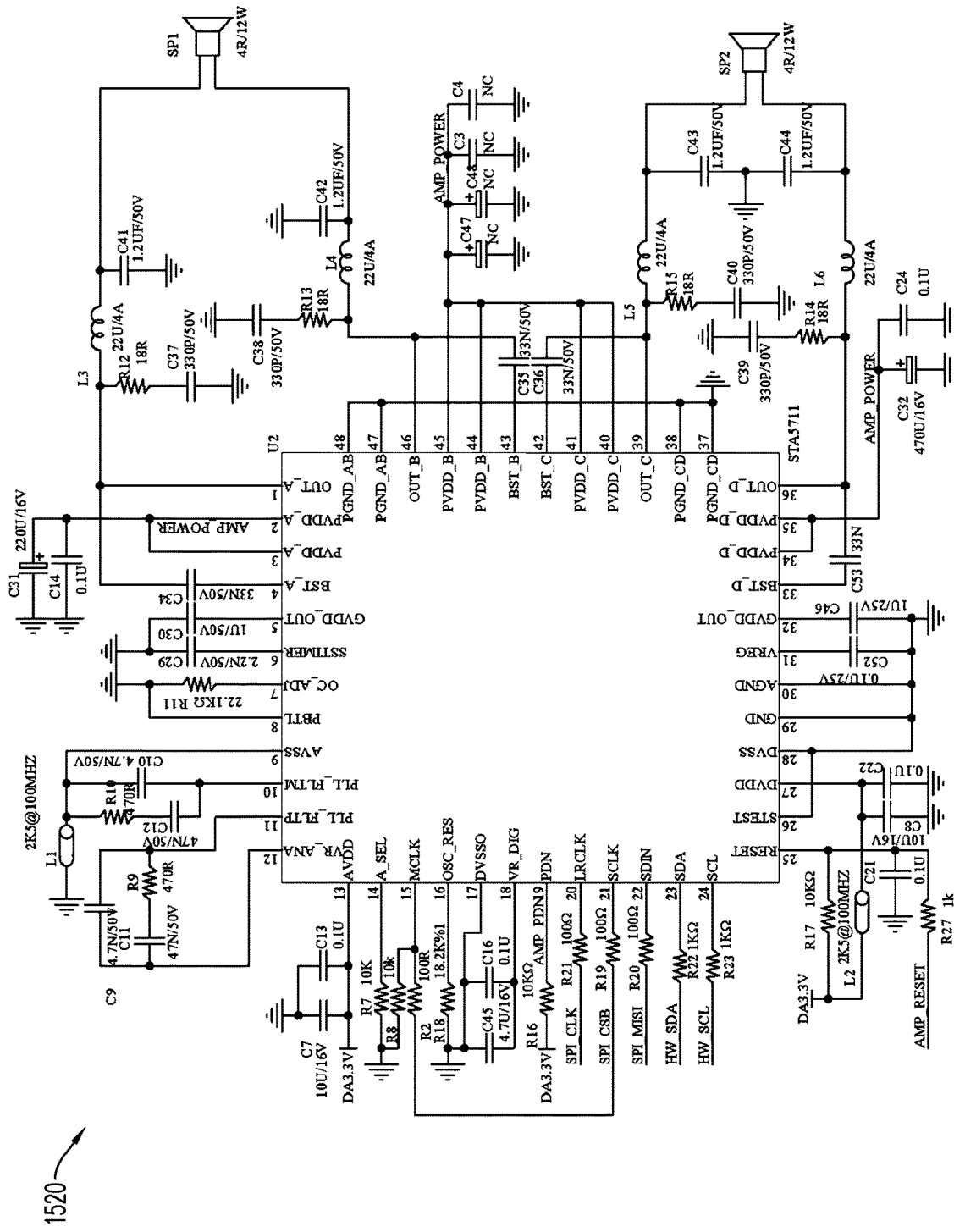
FIG. 31 shows an audio amplifying module circuit diagram according to an exemplary embodiment.
Figure 32:
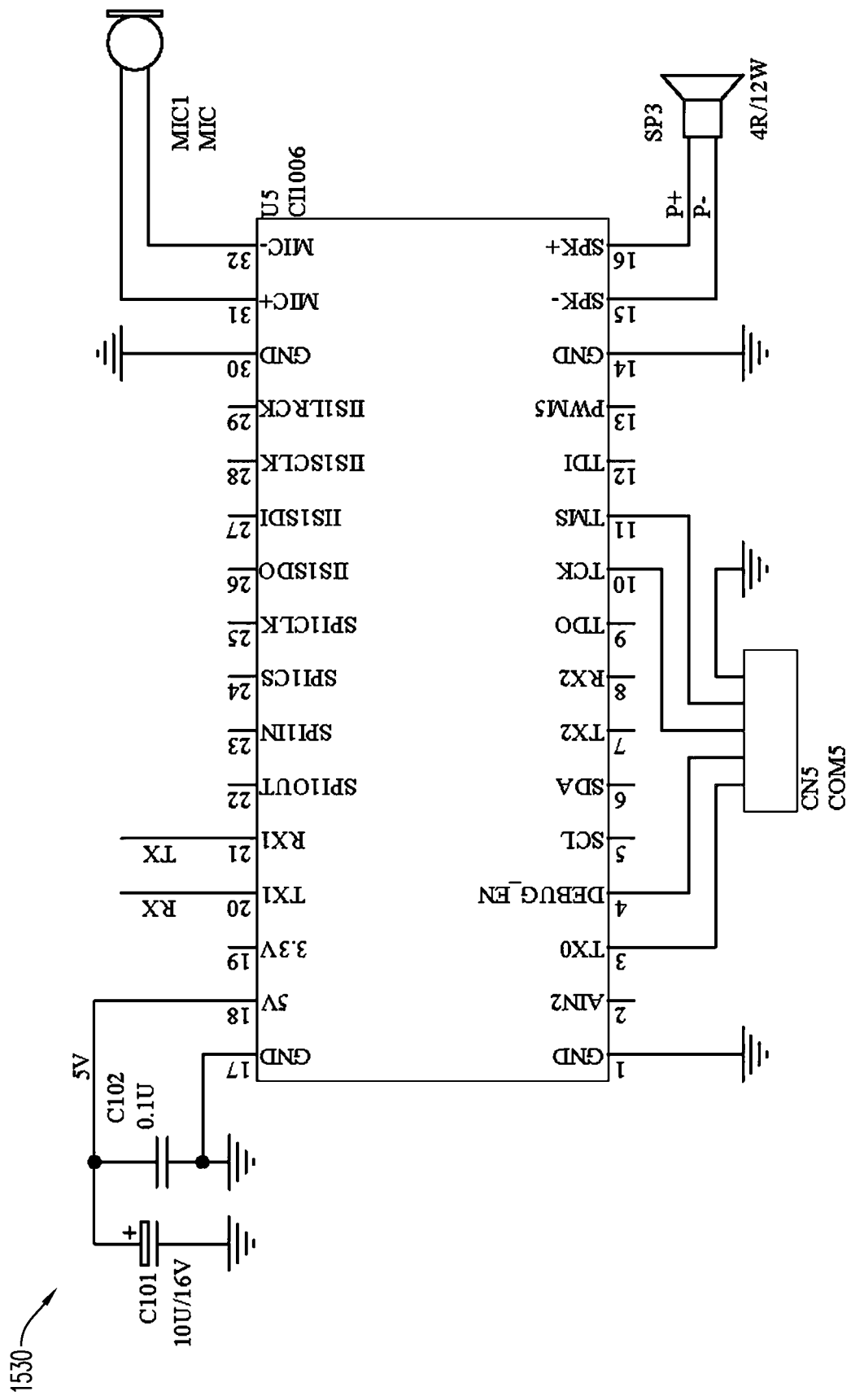
FIG. 32 shows a phonetic recognition module circuit diagram according to an exemplary embodiment.

With respect to FIG. 30, the abovementioned audio processing and controlling module 810 may include as part of a circuit 1510 therein a microcontroller MCU and an execution unit 330, the execution unit 330 may be connected to the microcontroller MCU, and a radio frequency (RF) pin on the microcontroller MCU may be connected to a radio frequency (RF) antenna ANT. The microcontroller and the RF antenna together may be configured for wireless data communication with an external audio device.

A Universal Serial Bus (USB) pin on the abovementioned microcontroller MCU may be connected to a USB interface USBSMD.

The abovementioned sound unit 815 may adopt as part of a circuit 1520 therein digital audio power amplifiers as part of an amplifying module 820. A set of audio output pins installed on the amplifiers may be connected to a loudspeaker SP1 340, with another set to a loudspeaker SP2 340' in a secondary supporting audio leg 400'. The whole of the amplifiers/amplifying module 820 may be connected to a universal I/O pin on the audio processing and controlling module 810 through an $I^2S$ bus. Alternatively, the loudspeaker 340 SP1 may be electrically connected directly to the microcontroller U1 and configured for converting and playing audio data from the microcontroller U1. The microcontroller U1 and the loudspeaker 340 SP1 together may be configured for playing audio data received by the RF antenna and the microcontroller U1.

A RESET pin on the digital audio power amplifiers/amplifying module 820 may be connected to a universal I/O pin on the audio processing and controlling module 810.

The abovementioned phonetic recognition module 320 may adopt as part of a circuit 1530 therein a smart phonetic chip, a MIC pin on which is connected to the microphone 305, an SPK pin on which is connected to an amplifier, and the smart phonetic chip is connected to the audio processing and controlling module 810 through a serial interface.

The abovementioned power module 1540 may include a +5V regulator chip and a +3.3V regulator chip. The input on the +3.3V regulator chip may be connected to the output on the +5V regulator chip.

As previously discussed with respect to an exemplary supporting audio leg 400 according to this disclosure, the carriage 850 may be installed inside the body portion 405, the circuit board 200 may be installed inside the carriage 850, and the control circuit 300 may be set on the circuit board 200.

The abovementioned carriage 850 may have the hole 851 therethrough, and the hole 851 through the carriage 850 may be aligned with the speaker opening 485 through the body portion housing 480 of the body portion 405, and each of the hole 851 through the carriage 850 and the speaker opening 485 through the body portion housing 480 positioned where the loudspeaker 340 is set to allow sound from the loudspeaker 340 to travel out of the supporting audio leg 400. The supporting post 410 is installed on the bottom of the abovementioned body portion 405, and the padding leg 860 is installed on the bottom of the supporting post 410.

In certain exemplary embodiments, the supporting audio leg 400 may include the body portion 405 and the circuit board 200 including the control circuit 300 installed within the body portion 405. The control circuit 300 may include the audio processing and controlling module 810, the amplifying module 820, the phonetic recognition module 320 and the execution unit 330. The amplifying module 820 may be connected to the audio processing and controlling module 810, with the amplifier installed on it. The phonetic recognition module 320 may be connected to the audio processing and controlling module 810, with the microphone 305 installed on it.

The supporting audio leg 400 may include the body portion 405 and the circuit board 200 including the control circuit 300 installed in the body portion 405. The control circuit 300 may include the audio processing and controlling module 810, and one of the sound unit 815 and the phonetic recognition module 320. The phonetic recognition module 320 may be connected to the audio processing and controlling module 810, with the microphone 305 installed on it.

In a further aspect, this disclosure relates generally to the furniture item 401, the furniture item 401 may contain the furniture body 499 and the abovementioned main supporting audio leg 400 with phonetic recognition feature may be installed on the furniture body 499, and one or more actuators 841, 842, 843, 844 may be set on the supporting audio leg 400 or on or within the furniture body 499. The actuator(s) 841, 842, 843, 844 may be connected to the supporting audio leg 400, for example and without limitation, the actuator(s) 841, 842, 843, 844 may be electrically connected to the audio processing and controlling module 810 and may receive voice control information sent by the supporting audio leg 400, via the phonetic recognition module 320 and/or the audio processing and controlling module 810. The actuator(s) 841, 842, 843, 844 may be one or more of, without limitation, a link linear driver 841, a massager 842, a heating cloth 843, and a lighting lamp 844. Other actuators for various furniture function(s) may be included in the same manner.

The abovementioned audio processing and controlling module 810 may include the microcontroller MCU and all kinds of I/O interfaces. The execution unit 330 may be connected to the microcontroller MCU through the I/O interfaces. A radio frequency processing circuit may be set inside the microcontroller MCU, connecting external antennas (ANT) through radio frequency antenna pins.

The USB pin on the abovementioned microcontroller MCU may be connected to a USB interface.

The abovementioned amplifying module 820 may adopt digital audio power amplifier(s). A set of audio output pins installed on the amplifiers may be connected to the speaker SP1 340, with another set to the speaker SP2 340'. The amplifiers may be connected to the abovementioned microcontroller MCU through an I²S interface.

The abovementioned phonetic recognition module 320 may adopt a smart phonetic chip, the MIC pin on which is connected to the microphone 305, and the chip may be connected to the audio processing and controlling module 810 through a serial interface.

The abovementioned body portion 405 contains the carriage 850 inside and the circuit board 200 is installed inside the carriage 850.

The supporting post 410 and the padding leg 860 may be installed on the bottom of the abovementioned body portion 405 or may be integral therewith.

The phonetic recognition module 320 and the audio processing and controlling module 810 may be set inside the supporting audio leg 400, enabling phonetic recognition, and audio playing and controlling, etc. Furthermore, in the exemplary embodiments the components mentioned above are hidden inside the body portion 405, which makes the furniture more harmonized.

The supporting audio leg 400 may include different shapes and geometries in various exemplary embodiments. The features and aspects of the exemplary embodiments of a supporting audio leg 400 are generally common to exemplary embodiments having various shapes and geometries. The shapes and geometries in any event provide a configuration for being installed at the bottom of sofa, beds, etc. Common features between differently shaped exemplary embodiments may include, among other things, a body portion 405 and a control circuit 300 installed in the body portion 405. The control circuit 300 may include the audio processing and controlling module 810, the sound unit 815, the phonetic recognition module 320, and the power module 1540. The sound unit 815 may be connected to the audio processing and controlling module 815, which may output sound signals to the sound unit 815; the loudspeaker 340 may be connected to the sound unit 815, which drives the loudspeaker 340 to produce sound; the phonetic recognition module 320 may be connected to and transfer an identification signal (e.g., for recognized speech) to the audio processing and controlling module 810; the power module 1540 may be used to supply power. In various exemplary embodiments, the power module 1540 may be used to supply power to the audio processing and controlling module 810, the sound unit 815, and the phonetic recognition module 320.

A general arrangement of the exemplary embodiments may include the carriage 850 being installed inside the body portion 405, the circuit board 200 being installed inside the carriage 850, and the control circuit 300 being set on the circuit board 200. The loudspeaker 340, which may be connected to the digital audio power amplifier U2, is embedded in the carriage 850, and a hole 851 through the carriage 850, for carrying the sound through the carriage 850, may be set where the loudspeaker 340 is set. In the exemplary embodiments, the hole may be set downwards towards the ground surface 403. The removable panel 412 may be installed on the top (i.e., towards the furniture item 401) of the body portion 405, protecting the circuit board 200 and other components inside the body portion 405.

In the exemplary embodiments, the supporting post 410 is installed on the bottom of the body portion 405 to support the furniture item 401. The padding leg 860 is installed on the bottom of the supporting post 410, increasing the friction between the supporting post 410 and the ground surface 403. Thus, the supporting audio leg 400 can be steadied.

In the exemplary embodiments, the audio processing and controlling module 810 may include the microcontroller U1 and execution unit 330 interface. The microcontroller U1 adopts a microcontroller of model SJBTM371 and it uses RF radio wireless to communicate. The RF pin on the microcontroller U1 is connected to an RF antenna ANT, which is used for wireless communication with one or more secondary supporting audio legs 400', 400". The secondary supporting audio leg(s) 400', 400" may include a secondary supporting audio leg 400', 400" that is nearest or within a given proximity to the supporting audio leg 400 containing the control circuit 300 including the microcontroller U1 and RF antenna ANT, and/or a preselected secondary supporting audio leg 400', 400". For purposes of this disclosure, a "secondary" supporting audio leg is a supporting audio leg that does not include and/or does not employ a control circuit but is instead controlled by the control circuit 300 in a "main" supporting audio leg, as explained further below. For purposes of this disclosure, a "main" supporting audio leg is a supporting audio leg that includes, for example and without limitation, a control circuit 300 for controlling and/or carrying-out functions of, without limitation, the supporting audio leg 400 and/or the actuators 841, 842, 843, 844 for the furniture item functions. For purposes of this disclosure, the phrase "supporting audio leg" or "supporting audio element" without a qualifier such as "main" or "secondary" will be understood as referring to a "main" supporting audio leg.

In the exemplary embodiments, the USB pin on the microcontroller U1 is connected to a USB interface USB-SMD, which is used to link the USB flash disk, play music stored in the USB flash disk, communicate, and even update firmware etc. The execution unit 330 interface may be connected to the microcontroller U1 and used to link, without limitation, the linear drivers 841, e.g., for a push rod, the heating cloth 842, the light strip 843, the massager 844, and the like installed on the furniture item 401, and control them through the micro controller U1.

In the exemplary embodiments, the sound unit 815 may adopt the digital audio power amplifier U2, which may adopt a digital audio power amplifier chip 1520 (FIG. 31) of model STA5711, which may be internally integrated with the audio processing and controlling module 810 and the amplifying module 820. The OUT_B pin on which may be linked to the loudspeaker 340 SP1, the OUT_C pin to the loudspeaker 340' SP2, for audio playing. In the exemplary embodiments and in specific use situations, the loudspeaker 340 SP1 may be set inside one supporting audio leg, and the loudspeaker 340' SP2, without any other circuit modules, may be located inside of the nearest or specified secondary supporting audio leg 400', 400". The digital audio power amplifier U2 may be connected with the universal I/O pin on the microcontroller U1 through I²S bus, and the microcontroller U1 may output audio signals to the amplifier U2 then to drive the loudspeaker 340 to play the audio. The RESET pin on the digital audio power amplifier U2 may be connected with a universal I/O pin on the microcontroller U1 and may output reset signals to the digital audio power amplifier U2 through the microcontroller U1 to maintain its normal operation.

In the exemplary embodiments, the phonetic recognition module 320 may adopt as part of the circuit 1530 the smart phonetic chip U5, which may adopt a chip (FIG. 32) of model CI1006. The MIC pin on the smart phonetic chip U5 may be linked to a microphone MIC. Speech signals may be collected through microphone MIC and sent to the smart phonetic chip U5 for phonetic recognition. The SPK pin on the smart phonetic chip U5 may be connected to a speaker SP3, which may be used to play recognized sounds associated with recognized signals. The smart phonetic chip U5 may be connected with and transfer the recognized signals to the microcontroller U1 through a serial interface.

In the exemplary embodiments, the power module 1540 (FIG. 33) may include a regulator chip U4, regulator chip U5 and regulator chip U6. The regulator chip U4 may be a +5V regulator chip, which can convert the external power to +5V power supply; the regulator chip U5 and regulator chip U6 may be +3.3V regulator chips, which can convert +5V power output from the regulator chip U4 to +3.3V power supply. In the exemplary embodiments, the regulator chip U4 may adopt a regulator chip of, e.g., model SY8113B (or, as other examples, IP6503S, MP1470, or the like), the regulator chip U5 may adopt a regulator chip of model 1117, the regulator chip U6 may adopt a regulator chip of, e.g., model 1117 (or, as other examples, 6206). A power supply may be set on or positioned within the supporting audio leg 400 and connected to the power module 1540, and when the supporting audio leg 400, a power adapter (not shown) may be inserted on AC mains, such that the power adapter may be inserted on the power supply interface 420 to supply power to the supporting audio leg 400 components through the power adapter.

In various exemplary embodiments, the supporting audio leg 400 as generally disclosed includes the body portion 405 and the control circuit 300 installed in the body portion 405. The control circuit 300 may include the audio processing and controlling module 810, the amplifying module 820, the phonetic recognition module 320 and the execution unit 330. The amplifying module 820 may be connected to the audio processing and controlling module 810, which may output sound signals to the amplifying module 820; the loudspeaker 340 may be connected to the amplifying module 820, which may drive the loudspeaker 340 to produce sound; the phonetic recognition module 320 may be connected to and transfer the identification signal to the audio processing and controlling module 810.

In the exemplary embodiments, the audio processing and controlling module 810 may include the microcontroller U1 and I/O interfaces. The microcontroller U1 may use radio wireless RF to communicate and its radio frequency aerial pins may be used to connect radio frequency aerials. In the exemplary embodiments, the USB pin on the microcontroller U1 may be connected to a USB interface, which may be used to charge the equipment, play music, communicate, and even update firmware etc. The execution unit 330 may be connected to the I/O interfaces of the microcontroller U1 and may be used to link one or more linear drivers 841, massagers 844, heating cloth 842, and lighting lamp 843, etc. installed on the furniture item 401. In the exemplary embodiments, the actuators including the linear drivers 841, massagers 844, heating cloth 842, and lighting lamp 843, etc. are separate from the execution unit 330—the execution unit 330 is an interface of the control circuit 300, while the linear drivers 841, massagers 844, heating cloth 842, and lighting lamp 843, etc. are external units, e.g., contained on or within in the furniture item body 499, and controlled via connections to the execution unit 330 and the microcontroller U1.

In the exemplary embodiments, the amplifying module 820 may adopt the digital audio power amplifier U2 (FIG. 31), the OUT_B pin on which is linked to the speaker SP1, and the OUT_C pin to the loudspeaker 340' SP2, for audio playing. In the exemplary embodiments and in specific situations, the loudspeaker 340 SP1 may be set inside one supporting audio leg 400, and the loudspeaker 340' SP2, without any other circuit modules, may be set inside the nearest or specified secondary supporting audio leg or legs 400', 400". The digital audio power amplifier U2 may be connected with the microcontroller U1 through an I²S interface, and the microcontroller U1 may output sound signals to the amplifier U2 then to drive the loudspeaker(s) 340, 340'.

In the exemplary embodiments, the phonetic recognition module 320 may adopt the smart phonetic module U5, the MIC pin on which may be linked to the microphone 305. Speech signals may be collected through the microphone 305 and sent to the smart phonetic module U5 for phonetic recognition. The module U5 may be connected with and transfer the recognized signals to the microcontroller U1 through a serial interface.

In an exemplary embodiment of a secondary supporting audio leg 400', the physical structure of the secondary supporting audio leg 400' is generally the same as the supporting audio leg 400 described generally in this disclosure. However, the secondary supporting audio leg 400' may not have an audio processing and controlling module, a phonetic recognition module, and an execution unit. The secondary supporting audio leg 400' may have only the loudspeaker 340' set inside it. The audio processing and controlling module 810, the phonetic recognition module 320, and the execution unit 300 may be set inside the main supporting audio leg 400. The secondary supporting audio leg 400' may be connected to the main supporting audio leg 400 through, without limitation, a connecting line such as an interconnect wire 404 or wireless RF connection, such as Bluetooth. In the case of a wireless RF connection, the secondary supporting audio leg 400' may include an RF antenna and signal conversion circuitry for receiving audio signals wirelessly from the main supporting audio leg 400. The connection between the main supporting audio leg 400 and the secondary supporting audio leg 400' may drive the loudspeaker 340' SP2 in the secondary supporting audio leg 400' to produce sound. Structurally, the only difference between the supporting audio leg 400 and the secondary supporting audio leg 400' may be respective interfaces of the main supporting audio leg 400 and the secondary supporting audio leg 400' for forming the connection(s) between the main supporting audio leg 400 and the secondary supporting audio leg 400'.

Accordingly, in the exemplary embodiments, the secondary supporting audio leg 400' may include a body portion 405 and a supporting post 410 that may be integral components or separate components joined or attached to each other by any known techniques or components. The secondary supporting audio leg 400' may include the loudspeaker 340' set inside the secondary supporting audio leg 400'. In specific situations, one or each of the body portion 405 and the supporting post 410 may be configured for a particular use. A padding leg 860 may be installed on the bottom of the supporting post 410, increasing the friction between the supporting post 410 and the ground surface 403. Thus, the secondary supporting audio leg 400' can be steadied. The padding leg 860 may be left out based on the material of the body portion 405 and the supporting post 410, and the same is true for the main supporting audio leg 400. The secondary supporting audio leg 400' according to the exemplary embodiments does not include a control circuit but includes a circuit interface 300' for receiving and interpreting audio signals.

This disclosure is not limited to the arrangements and configurations described herein and shown in the accompanying drawings. For example, in specific situations the control circuit 300 including, e.g., the audio processing and controlling module 810, the execution unit 330, and the phonetic recognition module 320, and/or other components such as the microphone 305 or a microphone port 421 may be set inside or on the supporting post 410. Contemplated variations may operate in the same manner as disclosed herein, such as by recognizing voice inputs through the phonetic recognition module 320, and then outputting the inputs, e.g., as electrical/digital signals, to the audio processing and controlling module 810. In other contemplated variations, the supporting post 410 may be an audio outlet for or house the loudspeaker 340, and a portion of the supporting let 410 may therefore be configured as a speaker outlet or grate. While harmonizing the appearance of the furniture item refers in this disclosure generally to containing the components of a supporting audio leg within the supporting audio leg, the spirit of the disclosure is not objectively limited thereto.

This disclosure includes the furniture item 401 having the furniture body 499 and abovementioned supporting audio leg 400, which includes the phonetic recognition feature in various embodiments. The supporting audio leg 400 may be installed on the furniture body 499, and an actuator 841, 842, 843, 844 may be set, for example, on the supporting audio leg 400 or on or in the furniture body 499. The actuator 841, 842, 843, 844 may be connected to the supporting audio leg 400 and receive voice control information sent by the supporting audio leg 400, and it can control functions of the furniture item through voice control commands received by the supporting audio leg 400. The actuator 841, 842, 843, 844 may include, without limitation, the linear drivers 841, massagers 844, heating cloth 842, and the lighting lamp 843.

In use, the supporting audio leg 400 may be installed on the bottom of a furniture item such as, without limitation, a sofa, bed, chair, and the like, to function both as a conventional furniture leg for supporting the furniture item and a supporting audio leg 400 as described throughout this disclosure. To play music, a user may connect or transmit a signal from an external audio device to the supporting audio leg 400, or may speak a command to play music, and the voice command may be received by the supporting audio leg 400, via, e.g., the microphone 305. The RF antenna may receive the audio data signals, and/or the smart phonetic recognition module 320 U5 may collect the voice command and recognize it and output it to the microcontroller U1, which may then control the audio playing and other execution units based on the transmitted audio data signals and/or phonetic information.

In various exemplary embodiments, the phonetic recognition module 320 and the audio processing and controlling module 810 are set inside the supporting audio leg 400, thereby enabling phonetic recognition, audio playing control, and furniture function controlling, etc. Furthermore, in the exemplary embodiments the components mentioned above are hidden inside of the supporting audio leg 400, which makes the furniture item 401 more harmonized.

The exemplary embodiments of a supporting audio leg 400 may, in an aspect, include a microcontroller MCU and an execution unit 330 interface. The execution unit 330 interface may be connected to the microcontroller MCU, and an RF pin on the microcontroller MCU may be connected to an RF antenna ANT.

Figure 18:
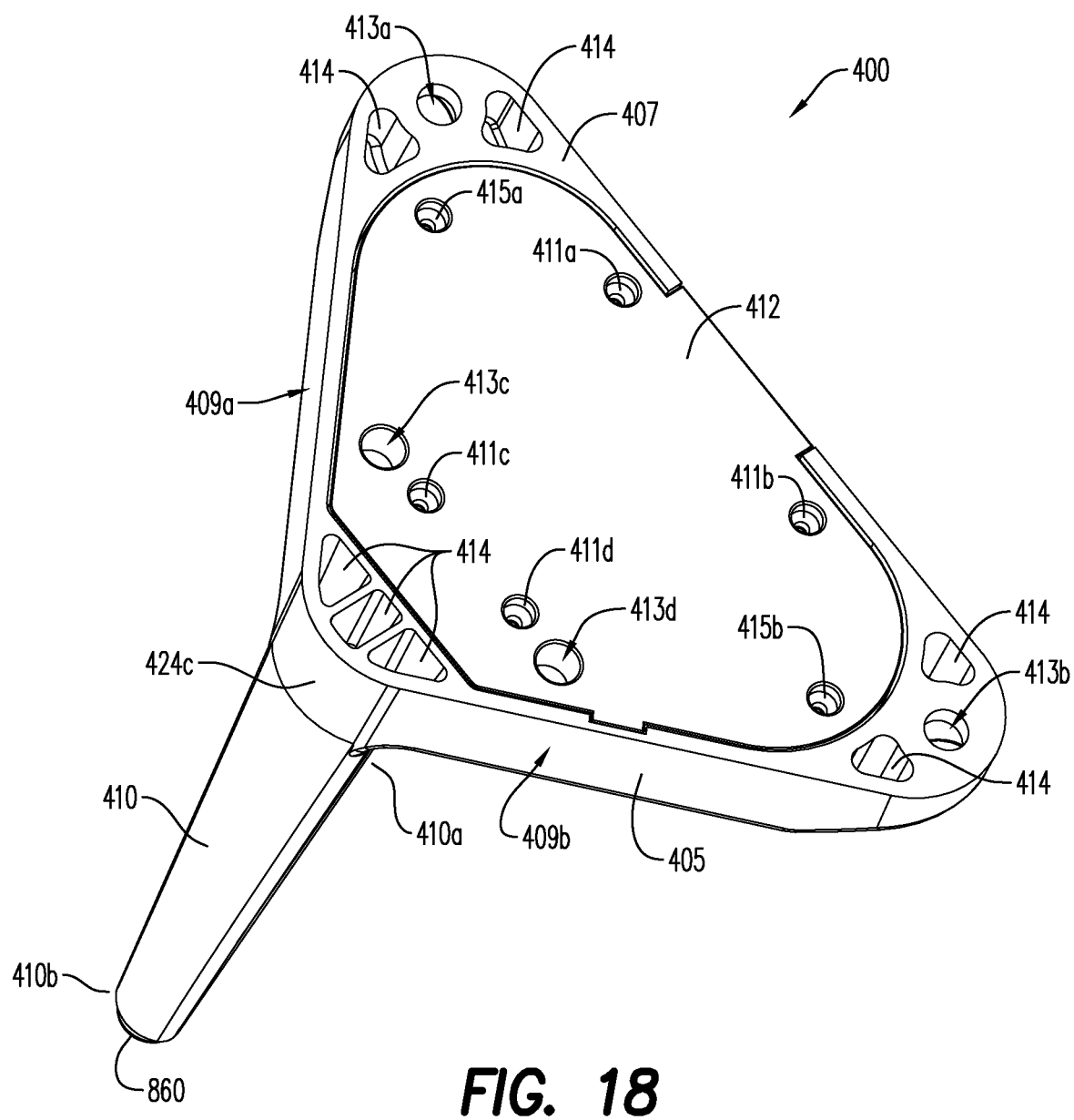
FIG. 18 is a perspective view of a supporting audio element according to an exemplary embodiment.
Figure 19:
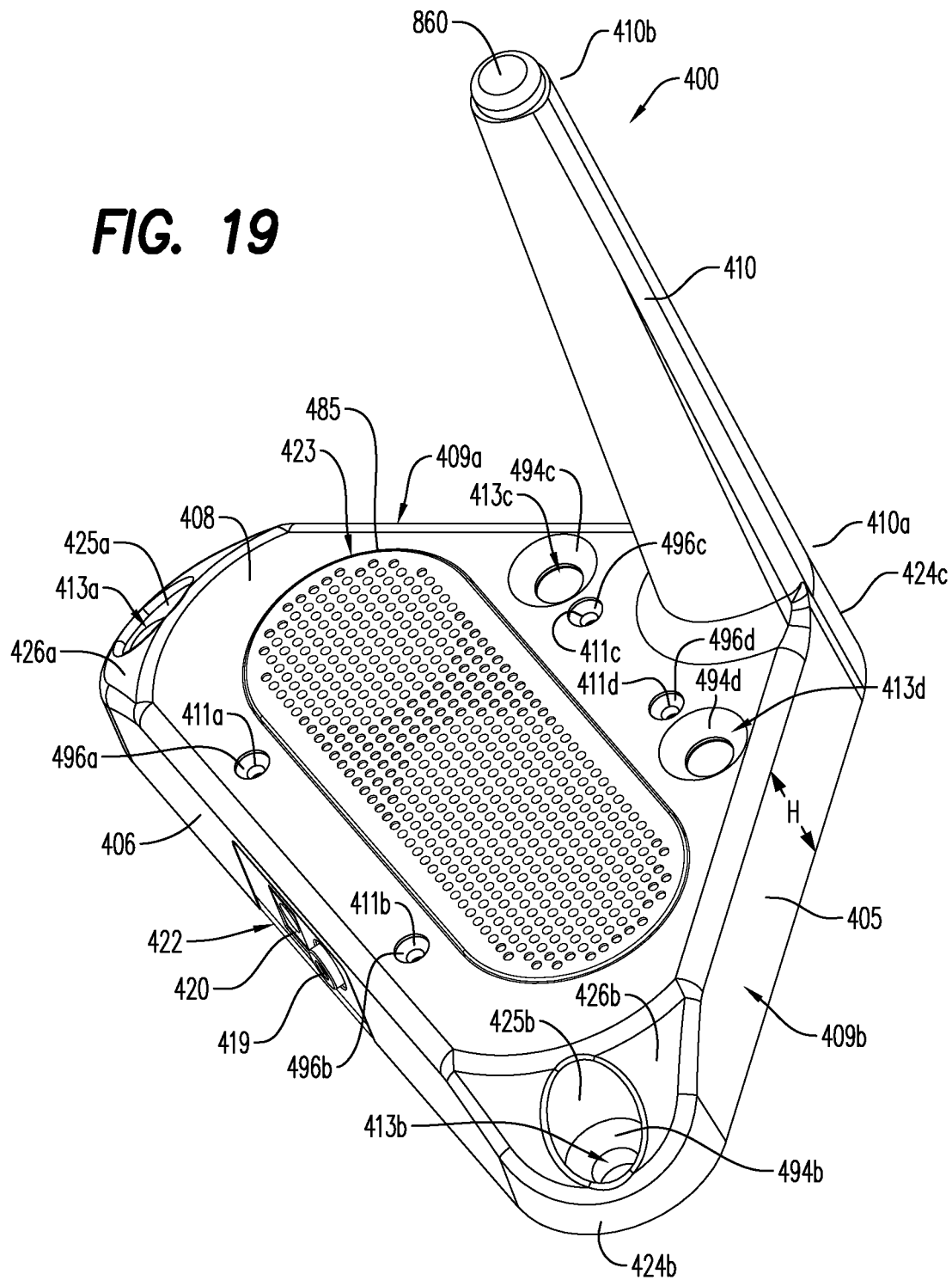
FIG. 19 is a perspective view of a supporting audio element according to an exemplary embodiment.
Figure 20:
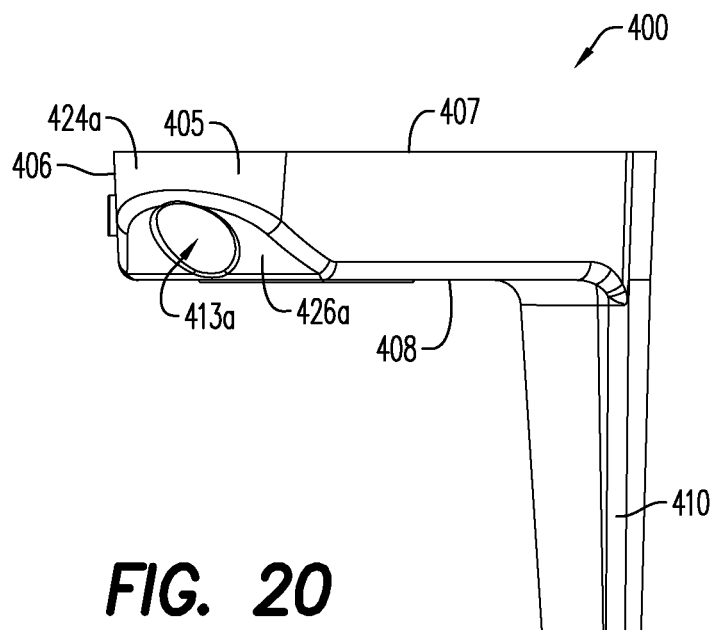
FIG. 20 is a side view of a supporting audio element according to an exemplary embodiment.
Figure 21:
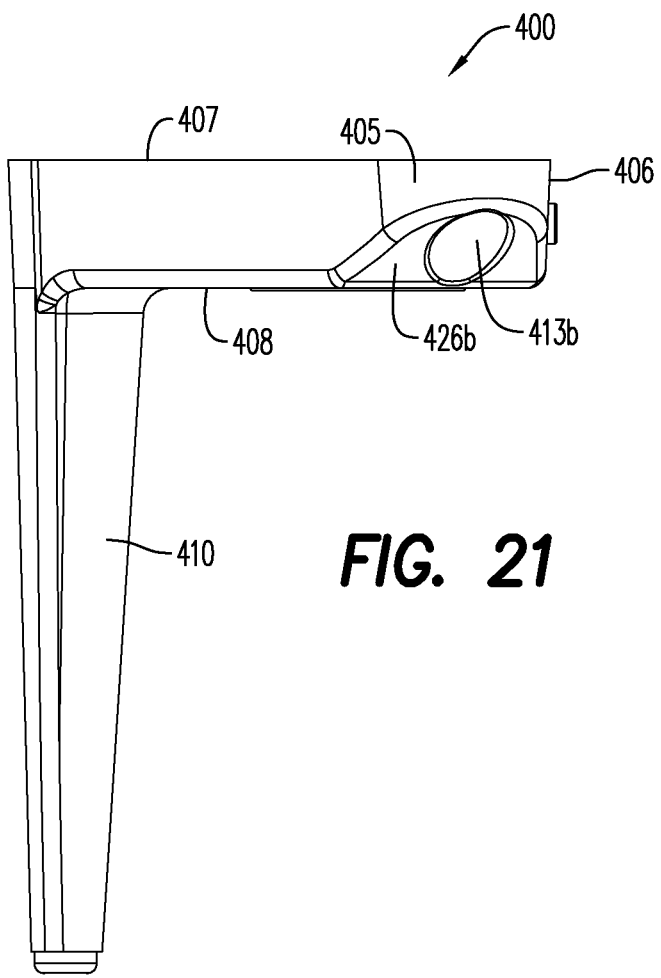
FIG. 21 is a side view of a supporting audio element according to an exemplary embodiment.
Figure 22:
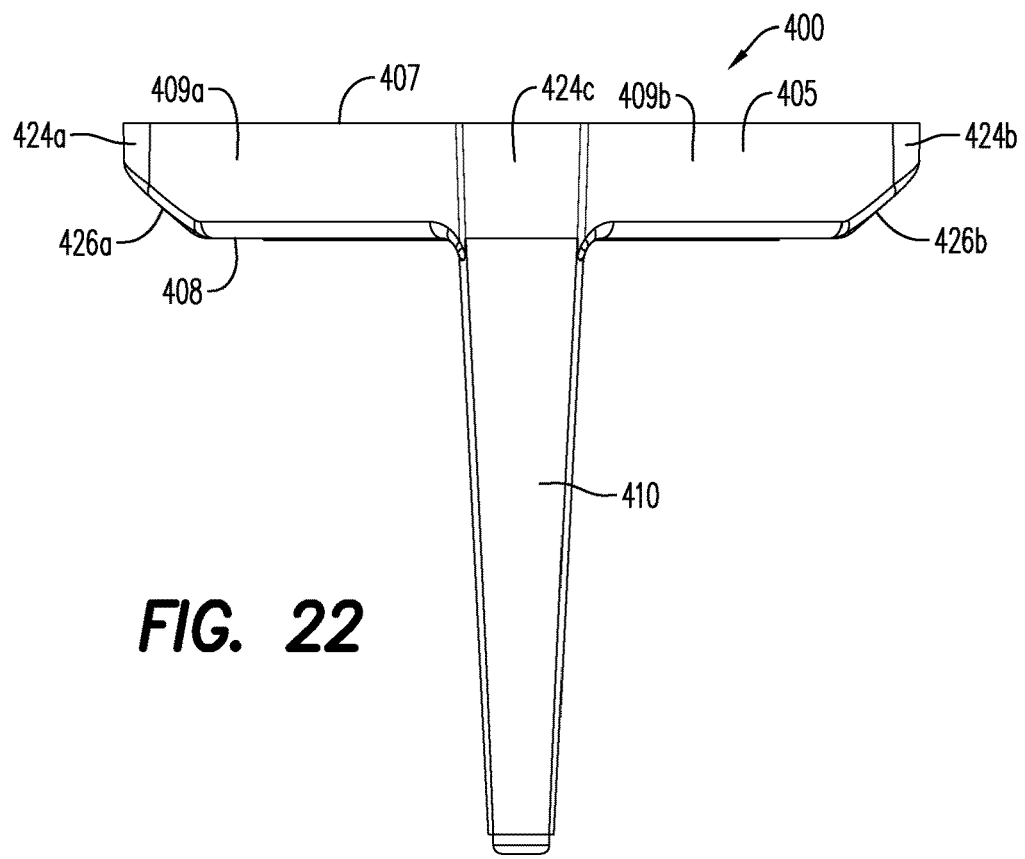
FIG. 22 is a front view of a supporting audio element according to an exemplary embodiment.

With general reference now to FIGS. 18-25, an exemplary embodiment of a supporting audio element configured as a supporting audio leg 400 for a furniture item 401 is disclosed. The exemplary embodiment includes a body portion 405 having a first wall 407 configured for mounting to the furniture item 401, a second wall 408 opposite the first wall 407, a rear wall 406, a first side wall 409a, a second side wall 409b, and vertices 424a, 424b, 424c. A supporting post 410 is connect to, and extends away from, the body portion 405. In the exemplary embodiment shown in FIGS. 18-25, the first wall 407, the second wall 408, the rear wall 406, the first and the second side walls 409a, 409b, and vertices 424a, 424b, 424c, along with a removable panel 412 together form the body portion housing 480 (as previously discussed) that defines an interior 481 of the body portion 405 in the same general manner as illustrated and discussed with respect to FIGS. 15-16. As previously mentioned, the various walls and portions of the body portion 405 that form the body portion housing 480 are not limited to any particular type, number, arrangement, or combination—instead, the body portion housing 480 is generally the structure of the body portion 405 connected atop the supporting post 410 and defining the interior area 481 of the body portion 405 in which various internal components may be positioned according the various exemplary embodiments. Disclosed connections, surface features, and configurations of the body portion 405 are understood as comprising the body portion housing 480. For example, as shown in FIGS. 18 and 19, the supporting post 410 is connected to and extends away from the second wall 408 and a third vertex 424c between the first and the second side walls 409a, 409b of the body portion 405, to the ground surface 403, for vertically raising and supporting the furniture item 401 on a ground surface 403. According to an aspect, the height H of the body portion 405 may measure, without limitation, between about 10 centimeters and about 25 centimeters.

The supporting audio leg 400 is connectable with the furniture item 401, which, according to an aspect of this disclosure, is a furniture item without multimedia capacity (i.e., the furniture item may not have electrical and/or multimedia components housed therein). In an aspect, the supporting audio leg 400 may include a loudspeaker 340 at least partially positioned within the interior area 481 of the body portion 405. For purposes of this disclosure, the exemplary embodiment shown in FIGS. 18-25 is understood to have a configuration of internal components as described with respect to FIG. 16, within the interior area 481 of the body portion 405.

The first wall 407 includes a plurality of mounting apertures 413 (e.g., mounting apertures 413a, 413b, 413c, and 413d) through which fasteners (not shown) may pass for attachment of the supporting audio leg 400 to the furniture item 401 adjacent the first wall 407. According to an aspect, mounting apertures 413 may be aligned on each of the second wall 408 and the first wall 407 and positioned such that a fastener passing through aligned mounting apertures 413 through the first wall 407 and the second wall 408 will be aligned with the supporting element connection 483 on the furniture item 401, when the body portion 405 is oriented for mounting on the supporting element connecting portion 482 of the furniture item 401. For example, interior mounting apertures 413c, 413d may be located at corresponding positions through each of the first wall 407 and the second wall 408. In an aspect, the mounting apertures 413 may include a threaded inner surface for engagement with a correspondingly threaded fastener. According to the exemplary embodiment shown in FIGS. 18-25, certain mounting apertures 413a, 413b may be positioned adjacent to one or more edges of the body portion 405, such as the mounting aperture 413a positioned at the first vertex 424a at the intersection of the first side wall 409a and the rear wall 406 of the body portion 405, and the mounting aperture 413b positioned at the second vertex 424b at the intersection of the second side wall 409b and the rear wall 406 of the body portion 405. In general, any number of mounting apertures 413 may be positioned in any location on the body portion 405 consistent with this disclosure, provided that, for example, a fastener placed therethrough would not interfere with the internal components within the interior area 481 of the body portion 405.

The supporting post 410 is connected to the body portion 405 at a first end 410a and extends away from the body portion 405 in a direction towards a second end 410b, opposite the first end 410a, for elevating the furniture item 401 in the same manner as a conventional furniture leg. The supporting post 410 may be formed from a variety of known materials sufficient for supporting a furniture item 401 in use. In the exemplary embodiment, the supporting post 410 is generally cylindrically shaped and tapering in a direction from the first end 410a to the second end 410b. According to the specific needs of the application, the supporting post 410 may be hollow or, alternatively, it may be solid. According to an aspect, the supporting post 410 may be formed, for example and without limitation, from a metal or alloy material, a rigid plastic material, wood, or the like. In other embodiments, the supporting post 410 may have any decorative shape and/or dimensions consistent with this disclosure. In the exemplary embodiment shown in FIGS. 18-25, the supporting post 410 is positioned at the third vertex 424c of the body portion 405. In other embodiments, the supporting post 410 may extend from the body portion 405 at another location. The supporting post 410 may be formed integrally with the body portion 405 or may be attached to the body portion 405 via known techniques including, without limitation, fasteners, clips, snap-fits (i.e., tabs against surface features), friction fits, threaded connections, adhesives, and the like. According to an aspect, a padding leg 860 may be installed at the bottom end 410b of the supporting post 410 to protect the ground surface 403 and/or provide friction between the bottom of the supporting post 410 and the ground surface 403.

The removable panel 412 may provide a detachable cover for the interior of the body portion 405. The removable panel 412 may be considered as a portion of the first wall 407 and occupy a portion thereof, for access to the components housed in the interior area 481 of the body portion 405 as previously discussed. The removable panel 412 may be considered generally as forming a portion of the first wall 407, for ease in describing the first wall 407 as the wall that is adjacent the supporting element connecting portion 482 of the furniture item 401 when the supporting audio leg 400 is mounted to the furniture item 401, and having features such as the mounting apertures 413c, 413d and others that are described with respect to the first wall 407.

The removable panel 412 is attached to the body portion 405 by, for example, panel securement apertures 411 (e.g., panel securement apertures 411a, 411b, 411c, and 411d), as previously discussed, that extend through the removable panel 412 for securing the removable panel 412 to the carriage 850 or other components within the interior area 481 of the body portion 405, or to another portion of the body portion 405 (i.e., the body portion housing 480). In the exemplary embodiment shown in FIGS. 18-25, the panel securement apertures 411 are sized and shaped to receive a fastener as previously discussed. In the exemplary embodiment, and without limiting the number or position of panel securement apertures generally, two panel securement apertures 411a, 411b are positioned adjacent to the rear wall 406 of the body portion 405, and two panel securement apertures 411c, 411d are positioned proximate to each of the first side wall 409a and second side wall 409b in a spaced apart configuration.

Figure 24:
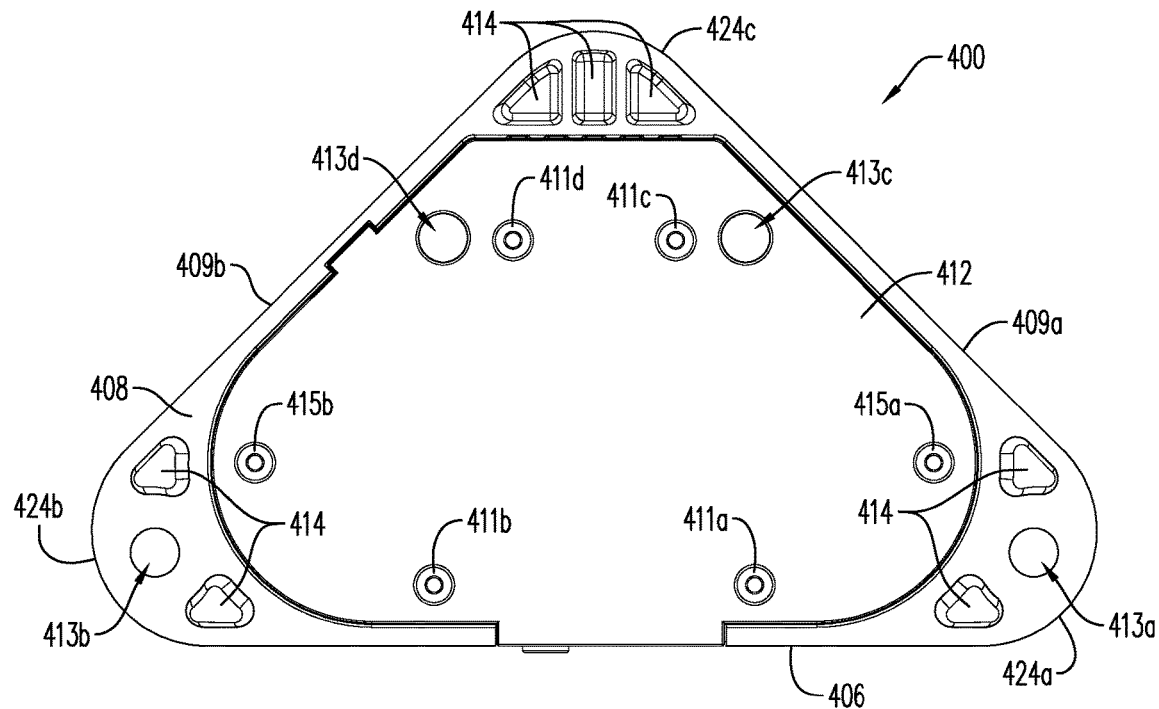
FIG. 24 is a top view of a supporting audio element according to an exemplary embodiment.

According to the exemplary embodiment as shown in FIGS. 18 and 24, one or more cavities 414 may be formed on the first wall 407 extending into the body portion 405 towards the second wall 408. The cavities 414 may be formed at the one or more vertices 424 (e.g., vertex 424a, 424b, 424c) of the body portion 405. Cavities 414 may provide savings in manufacturing costs by requiring less material, and/or accommodate secondary structures that may be present on the supporting element connecting portion 482 of the furniture item 401.

Figure 25:
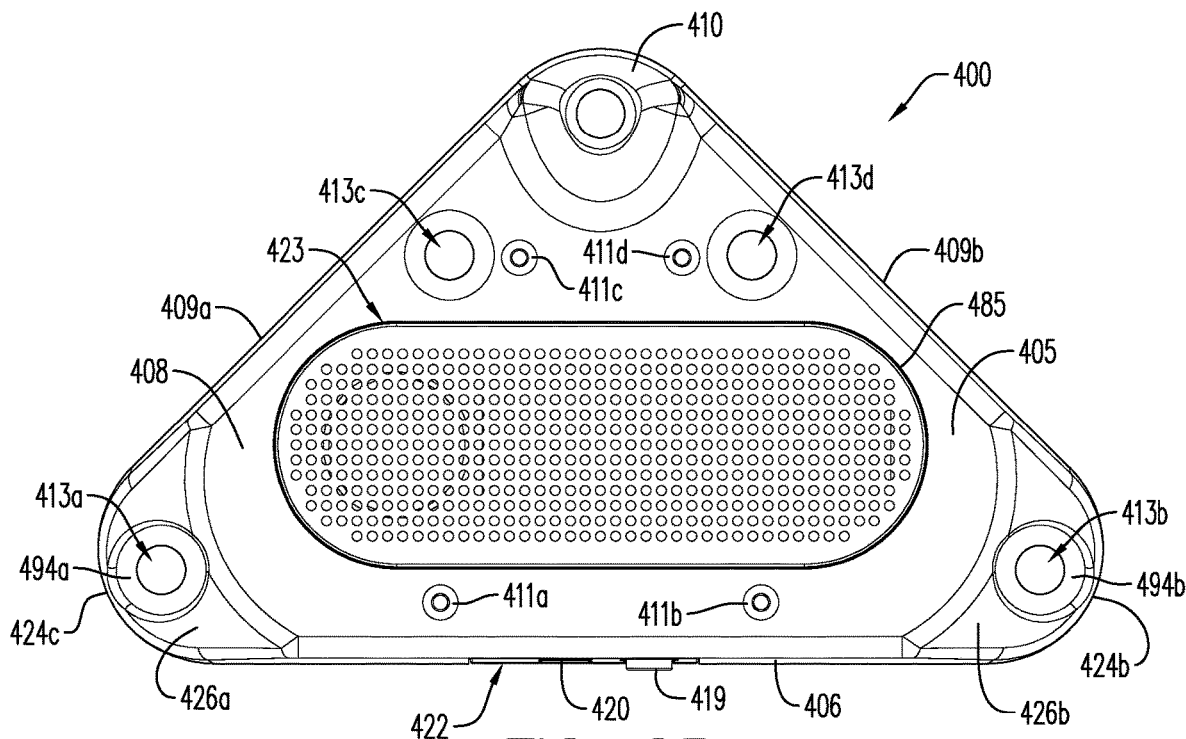
FIG. 25 is a bottom view of a supporting audio element according to an exemplary embodiment.

According to an aspect of the exemplary embodiment, as shown in FIGS. 19 and 25, the body portion 405 includes a speaker opening 485 through the second wall 408 and oriented towards the ground surface 403 for sound emission from the loudspeaker 340. According to an aspect, the loudspeaker 340 may be housed within the interior area 481 of the body portion 405. A speaker grill 423 is positioned within the speaker opening 485, as previously discussed, in alignment with the loudspeaker 340, to protect the components housed within the interior area 481 of the body portion 405. The speaker grill 423 may be arranged within the interior area 481 of the body portion 405 as discussed with respect to the exemplary embodiments in FIGS. 14 and 16-17. Alternatively, the speaker grill may be formed as an integral feature of the second wall 408, or in any configuration consistent with this disclosure. According to an aspect, body portion interior apertures 415a, 415b may be formed through the removable panel 412 for receiving fasteners for mounting the speaker grill 423 (and/or other components) within the body portion 405, as previously discussed.

According to an aspect and as shown in FIGS. 19-22 and 25, portions 426a, 426b of the second wall 408 in the exemplary embodiment are sloped at a first vertex 424a and a second vertex 424b such that the second wall 408 slopes in a direction towards the first wall 407. The first and the second vertices 424*a*, 424*b* may also constitute respective peripheral portions that extend between the rear wall 406 and each of the first side wall 409*a* and the second side wall 409*b*, in the same manner as the third vertex 424*c* constitutes a peripheral portion that extends between the first side wall 409*a* and the second sidewall 409*b*. The peripheral portions defined by the vertices 424*a*, 424*b*, 424*c* may be considered as part of the body portion 405/body portion housing 480. A first recess 425*a* is positioned on the sloped portion 426*a* of the second wall 408 adjacent to the first vertex 424*a*, and a second recess 425*b* is positioned on the sloped portion 426*b* of the second wall 408 adjacent to the second vertex 424*b*, and each recess 425*a*, 425*b* extends into the body portion 405 towards the first wall 407. Each of the mounting apertures 413*a*, 413*b* adjacent the first and the second vertex 424*a*, 424*b* is formed in the corresponding recess 425*a*, 425*b* through a shelf 494*a*, 494*b* positioned within the recess 425*a*, 425*b*. The shelf 494*a*, 494*b* provides a surface against which, for example, a compressing surface of a fastener may contact and provide a mounting force for mounting the supporting audio leg 400 to the furniture item 401.

The second wall 408 further includes interior mounting apertures 413*c*, 413*d* correspondingly positioned with the interior mounting apertures 413*c*, 413*d* on the first wall 407, for together forming a path to a align a fastener with a supporting element connection 483 on a furniture item 401, as previously discussed. Each of the interior mounting apertures 413*c*, 413*d* on the second wall 408 includes a countersink portion 494*c*, 494*d* similar to the shelves 494*a*, 494*b* in the recesses 425*a*, 425*b*, for providing a compression surface against which a fastener compressing portion may provide a mounting force.

The second wall 408 similarly includes panel securement apertures 411*a*, 411*b*, 411*c*, 411*d* corresponding to the panel securement apertures 411*a*, 411*b*, 411*c*, 411*d* on the first wall 407, for aiding in securing the various internal components, such as the carriage 850, to which the removable panel 412 may be secured. As with the interior mounting apertures 413*c*, 413*d* through the second wall 408, the panel securement apertures 411*a*, 411*b*, 411*c*, 411*d* through the second wall 408 may include countersink portions 496*a*, 496*b*, 496*c*, 496*d* for the same purposes as the countersink portions 494*c*, 494*d* of the interior mounting apertures 413*c*, 413*d* through the second wall 408.

Figure 23:
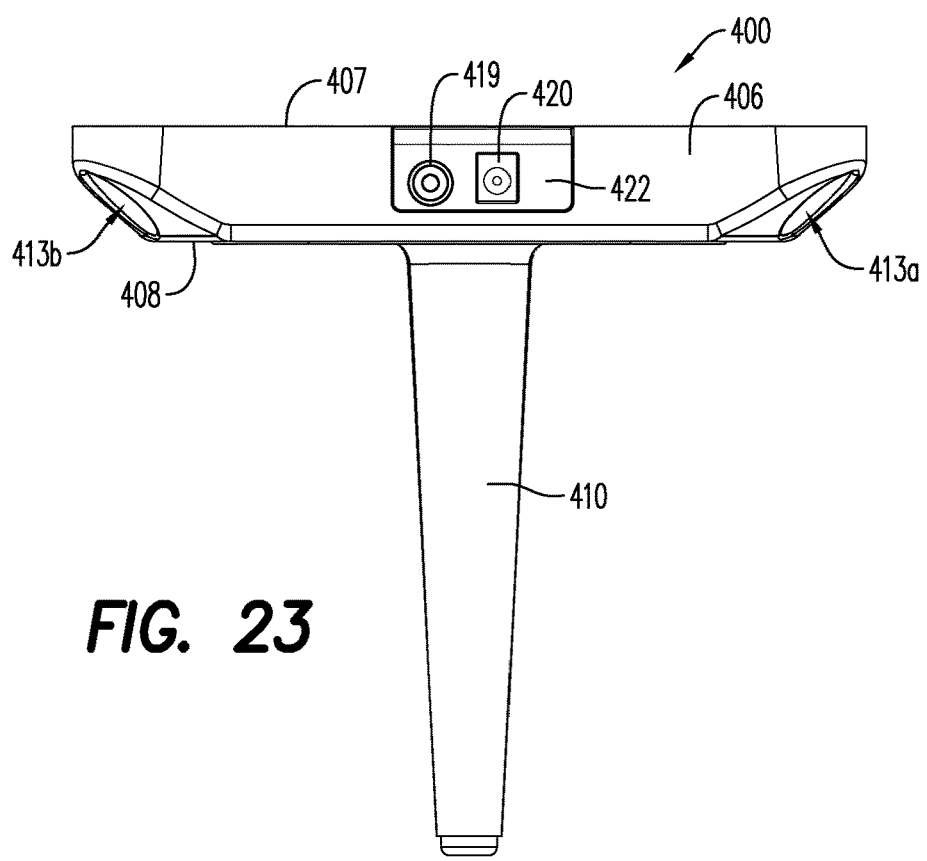
FIG. 23 is a rear view of a supporting audio element according to an exemplary embodiment.

With reference now to FIGS. 19, 23, and 25, the exemplary supporting audio leg 400 may include the interface panel 422 on the rear wall 406 for connection of the supporting audio leg 400 to external devices or structures. According to an aspect, an interconnect port 419 and a power supply/input port 420 are positioned on the interface panel 422 as previously discussed with respect to FIGS. 13-17. The interface panel 422 in the exemplary embodiment is formed, for example, on the carriage 850 (as previously discussed) or on the rear wall 406 of the supporting audio leg 400 but is not so limited in position or configuration. In addition, the ports such as the interconnect port 419 and the power supply/input port 420 may independently be formed in the body portion 405, e.g., the body portion housing 480, itself, without an interface panel 422 and/or in different locations.

According to an aspect, the interconnect port 419 may provide a wired connection between the supporting audio leg 400 and an external component, such as a secondary audio leg 400', 400", as discussed with respect to FIGS. 12A-12B, or one or more external devices (e.g., external musical devices, a stereo, a music file reader, a cell phone, an external microphone, or an external speaker). The interconnect port 419 may be, without limitation, a standard jack (for example, a standard 3.5 mm cabled audio exit), an XLR connector, a USB port, or any another known connector consistent with this disclosure. In additional embodiments, the supporting audio leg 400 may include more than one interconnect port 419, such as optional port 498 (FIGS. 14-16) for connection with multiple external devices including multiple secondary supporting audio legs 400', 400".

The power supply/input port 420 receives a connector (not shown) to a power adapter that supplies power to the power module 1540 that supplies power to the electrical components, as previously discussed. The power supply/input port 420 may be, for example and without limitation, a jack, an outlet, a socket, or the like. The power supply port 420 may be configured to receive power in any phase required by a particular application.

With reference now to FIG. 26, an exemplary embodiment of a supporting audio leg 400 including an interchangeable supporting post 410 is disclosed. The interchangeable supporting post 410 is removably attached to the body portion 405 and may be substituted with various conventional, standard-sized supporting posts, to provide a particular aesthetic. In the exemplary embodiment shown in FIG. 26, the supporting post 410 includes an attachment post 416 extending from a mounting end surface 417 at the first end 410*a* of the supporting post 410. The body portion 405 includes a corresponding mounting port 418 configured complimentarily to the attachment post 416, for removably receiving the attachment post 416 and thereby removably attaching the supporting post 410 to the body portion 405.

The mounting port 418 may be positioned on the second wall 408 of the body portion 405 and extend into the body portion 405, towards the second wall 407, forming a receptacle for receiving and directly engaging the attachment post 416 along all or a portion of its length. The connection between the attachment post 416 and the mounting port 418 may be by any known technique for forming a removable connection consistent with this disclosure. In the exemplary embodiment shown in FIG. 26, for example, the attachment post 416 may include an external threaded portion 427 that is sized complimentarily to an internal threaded portion 428 within the mounting port 418. The attachment post 416 may, in such embodiment, be threadingly received in the mounting port 418.

In various exemplary embodiments, attachment post 416 may constitute, without limitation, a ⅜"-16 or 5⁄16"-18 threaded fastener, and the mounting port 418 may have a complimentary size and threading for receiving the threaded fastener. As previously discussed, the removable connection between the interchangeable supporting post 410 and the mounting port 418 is not limited to the exemplary arrangement shown in FIG. 26 or, in the case of a threaded connection, to a threaded connection of any size. For example, the removable connection may be via fasteners, clips, snap-fits (i.e., tabs against surface features), friction fits, adhesives, and the like. The attachment post 416 may have any shape, size, or orientation consistent with this disclosure. The attachment post 416 may be an integral portion of the supporting leg 410, machined for connecting to the body portion 405. Moreover, in the case of a threaded connection, any thread type, pattern, size, pitch, etc. consistent with this disclosure may be used, including, without limitation, metric sizes, non-standard thread designs, or other threaded engagements forming a removable connection between the supporting post 410 and the mounting port 418 consistent with this disclosure. Many conventional furniture supporting legs are connected by a threaded fastener on the supporting leg to a hole/port in a mounting block or other structural component on the furniture item. The exemplary ⅜"-16 and 5/16"-18 size threaded fasteners are widely used in such conventional supporting legs. Thus, the exemplary interchangeable supporting post 410 having one of the exemplary thread sizes on the external threaded portion 427 of the attachment post 416 accommodates a wide variety of supporting leg and design options for interchanging with the exemplary interchangeable supporting post 410. Accordingly, in the event that a user would like to use a particular supporting leg and have the functionality of a supporting audio leg as described throughout this disclosure, the user may simply remove the interchangeable supporting post 410 as shown in FIG. 26 and replace it with any supporting leg having a fastener with the same size threading. More generally, the interchangeable supporting post 410 according to this disclosure may be interchanged with any furniture supporting leg having a corresponding structure/technique for attaching to the body portion 405.

With reference now to FIG. 27, various exemplary embodiments of a supporting audio leg 400 according to this disclosure may further include a microphone interface 421 for directing speech signals to the microphone 305. In the exemplary embodiment shown in FIG. 27, the microphone interface 421 is a screened opening through the interface panel 422, although not limited thereto.

Figure 28A:
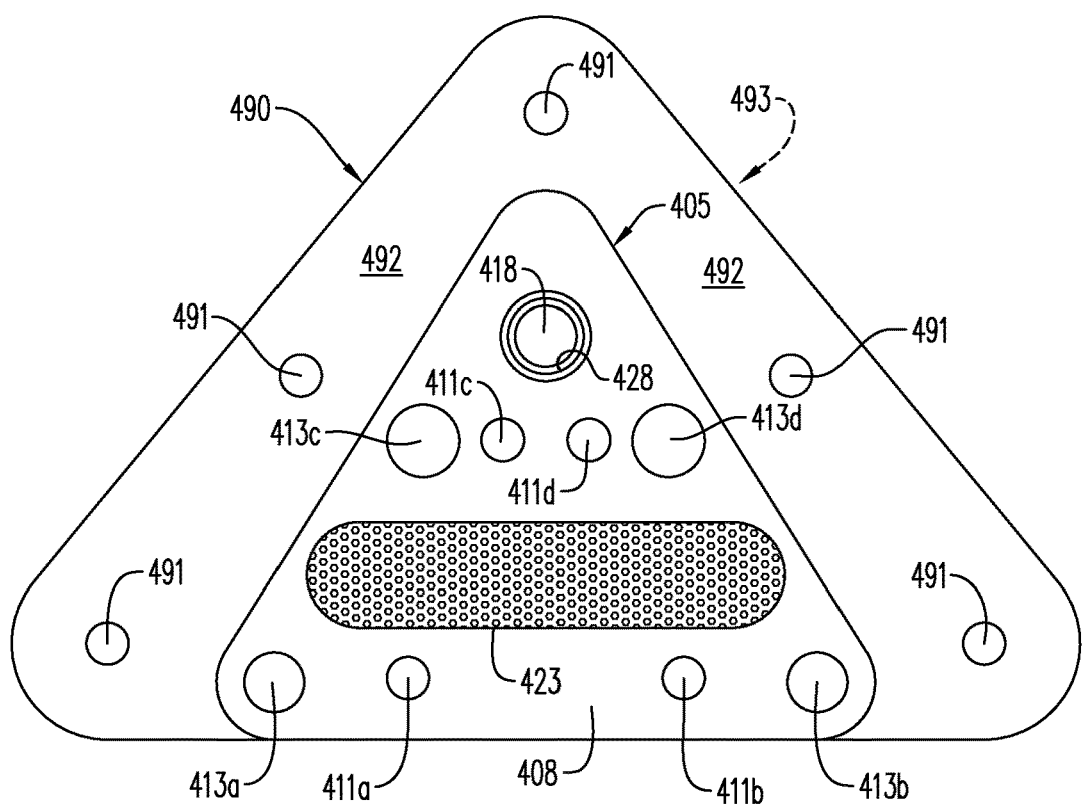
FIG. 28A is a bottom view of a mounting plate and body portion according to an exemplary embodiment.
Figure 28B:
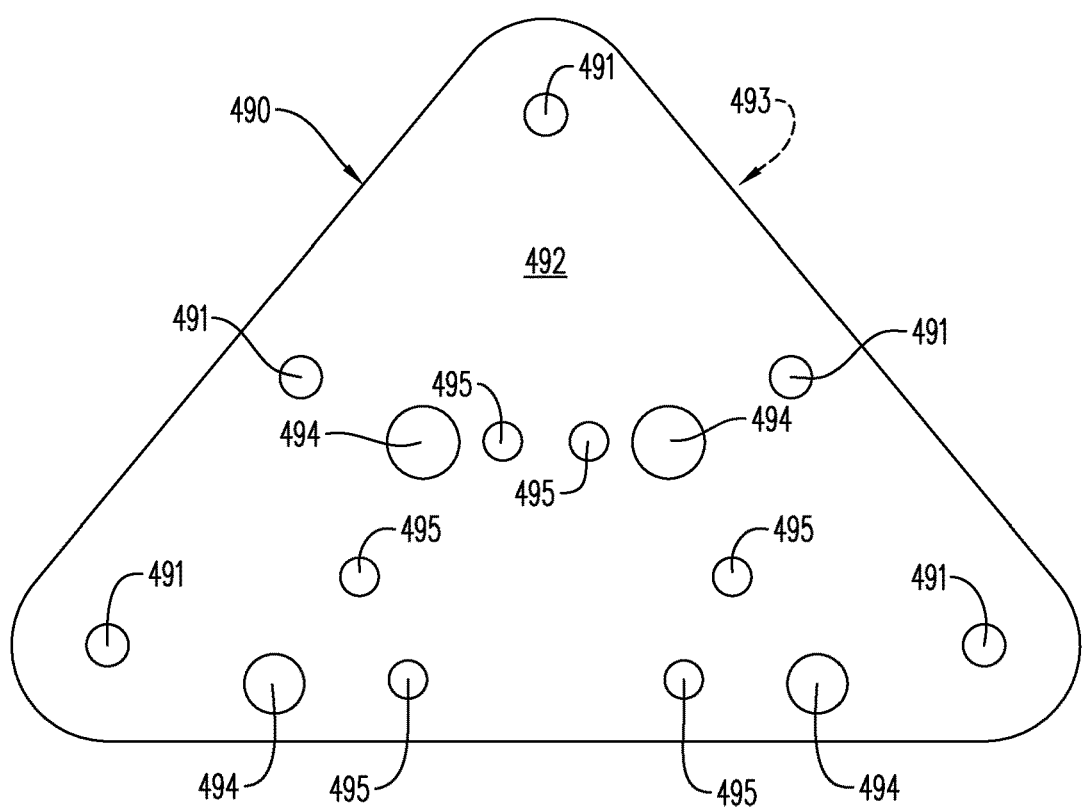
FIG. 28B is a bottom view of a mounting plate according to an exemplary embodiment.

With reference now to FIGS. 28A and 28B, an exemplary mounting plate 490 for adapting an exemplary supporting audio leg 400 according to this disclosure for mounting to the furniture item 401 is illustrated. FIG. 28A shows the mounting plate 490 mounted to a body portion 400 of an exemplary supporting audio leg 400. FIG. 29B shows the mounting plate 490 unattached. The exemplary mounting plate 490 includes a top surface 493 and a bottom surface 492 opposite the top surface 493. The mounting plate 490 may be mounted to the supporting element connecting portion 482 on the furniture item 401, between the body portion 405 of the supporting audio leg 400 and the supporting element connecting portion 482, with the top surface 493 of the mounting plate 490 adjacent the supporting element connecting portion 482 and the bottom surface 492 adjacent the body portion 405 of the supporting audio leg 400. The exemplary mounting plate 490 includes a plurality of mounting holes 491 formed through the mounting plate 490, for receiving, e.g., screws or fasteners for mounting the mounting plate 490 to the supporting element connecting portion 482. The mounting holes 491 may be positioned for providing a variety of connection configurations between the mounting plate 490 and the supporting element connecting portion 482. Unless expressly noted otherwise, "mounting" with respect to FIGS. 28A and 28B refers to screws/fasteners in the exemplary embodiments but is not limited thereto.

In certain exemplary embodiments in which the body portion 405 may be configured for mounting directly to the supporting element connecting portion 482 but, for example, require additional stability, the body portion 405 may be mounted to the supporting element connecting portion 482 through the mounting portion 490, e.g., through pass-through apertures 494 in the mounting plate 490 corresponding to mounting apertures 413a, 413b, 413c, 413d on the body portion 405, and the mounting plate 490 may be mounted to the supporting element connecting portion 482 through mounting holes 491 as well. In such configuration where the mounting plate 490 is mounted, via pass-through apertures 494, between the body portion 405 and the supporting element connecting portion 482, the mounting plate 490 may replace, for example, the removable plate 412 as a cover to the first wall 407. Alternatively, the mounting plate 490 may be mounted to the panel securement apertures 411a, 411b, 411c, 411d and/or body portion interior apertures 415a, 415b on the first wall 407 of the body portion 405, via correspondingly aligned supporting leg mounting apertures 495 through the mounting plate 490.

In certain exemplary embodiments in which the body portion 405 may not be configured for mounting directly to the supporting element connecting portion 482 because, for example, the mounting apertures 413a, 413b, 413c, 413d are not positioned precisely for such mounting, the mounting plate 490 may be mounted to the body portion 405, as previously discussed, through supporting leg mounting apertures 495 through the mounting plate 490 that align with one or more panel securement apertures 411a, 411b, 411c, 411d and/or body portion interior apertures 415a, 415b on the first wall 407 of the body portion 405, to secure the mounting plate 490 to the body portion 405. The mounting plate 490 may then be mounted to the supporting element connecting portion 482 through mounting holes 491.

While the exemplary mounting plate 490 is shown in FIG. 28A in use with the exemplary supporting audio leg 400 having the mounting port 418, the mounting plate 490 is not limited to use therewith. The mounting plate 490 may be particularly useful in conjunction with the exemplary supporting audio leg 400 having an interchangeable supporting post because, for example, a user may decide to "convert" a conventional furniture item, to use the supporting audio leg 400 with the conventional furniture item that may be not be adapted for installation of the supporting audio leg 400. In such case, the mounting plate 490 would facilitate attachment of the supporting audio leg 400 to the furniture item, while the mounting port 418 would facilitate use of an original/desired supporting post for the furniture item.

In various exemplary embodiments, a supporting audio leg 400 may include one or more of the features and functions disclosed herein, in various combinations, as preferred or as applications may require. The exemplary embodiments may also provide easier access to a controlling and audio playing component in a furniture item as compared to, e.g., a comparable component built within the furniture body. Easier access may aid in accessing connections, repairing, replacing, and servicing such a component, connecting power supplies, and the like.

This disclosure, in various embodiments, configurations and aspects, includes components, methods, processes, systems, and/or apparatuses as depicted and described herein, including various embodiments, sub-combinations, and subsets thereof. This disclosure contemplates, in various embodiments, configurations and aspects, the actual or optional use or inclusion of, e.g., components or processes as may be well-known or understood in the art and consistent with this disclosure though not depicted and/or described herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

In this specification and the claims that follow, reference will be made to a number of terms that have the following meanings. The terms "a" (or "an") and "the" refer to one or more of that entity, thereby including plural referents unless the context clearly dictates otherwise. As such, the terms "a"

(or "an"), "one or more" and "at least one" can be used interchangeably herein. Furthermore, references to "one embodiment", "some embodiments", "an embodiment" and the like are not intended to be interpreted as excluding the existence of additional embodiments that also incorporate the recited features. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Terms such as "first," "second," "upper," "lower", etc. are used to identify one element from another, and unless otherwise specified are not meant to refer to a particular order or number of elements.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

As used in the claims, the word "comprises" and its grammatical variants logically also subtend and include phrases of varying and differing extent such as for example, but not limited thereto, "consisting essentially of" and "consisting of" Where necessary, ranges have been supplied, and those ranges are inclusive of all sub-ranges therebetween. It is to be expected that the appended claims should cover variations in the ranges except where this disclosure makes clear the use of a particular range in certain embodiments.

The terms "determine", "calculate" and "compute," and variations thereof, as used herein, are used interchangeably and include any type of methodology, process, mathematical operation or technique.

This disclosure is presented for purposes of illustration and description. This disclosure is not limited to the form or forms disclosed herein. In the Detailed Description of this disclosure, for example, various features of some exemplary embodiments are grouped together to representatively describe those and other contemplated embodiments, configurations, and aspects, to the extent that including in this disclosure a description of every potential embodiment, variant, and combination of features is not feasible. Thus, the features of the disclosed embodiments, configurations, and aspects may be combined in alternate embodiments, configurations, and aspects not expressly discussed above. For example, the features recited in the following claims lie in less than all features of a single disclosed embodiment, configuration, or aspect. Thus, the following claims are hereby incorporated into this Detailed Description, with each claim standing on its own as a separate embodiment of this disclosure.

Advances in science and technology may provide variations that are not necessarily express in the terminology of this disclosure although the claims would not necessarily exclude these variations.

What is claimed is:

1. A supporting audio leg, comprising:
a body portion including a body portion housing, wherein the body portion housing includes a first surface configured to attach to a bottom surface of the furniture item body, a second surface opposite the first surface and configured to face downward towards a ground surface, and a speaker opening, and the body portion housing defines an interior area of the body portion;
a supporting post connected to and extending away from the body portion housing; and
a loudspeaker positioned within the interior area of the body portion; and
a control circuit positioned within the interior area of the body portion, wherein:
the control circuit includes a phonetic recognition module and an audio processing and controlling module electrically connected to the phonetic recognition module,
the phonetic recognition module is configured to receive a speech signal from a microphone,
the phonetic recognition module is configured for recognizing a voice command in the speech signal and relaying the voice command to the audio processing and controlling module, and
the audio processing and controlling module is configured for controlling a function responsive to the voice command;
wherein:
the supporting audio leg is configured to support and elevate a furniture item body above the ground surface,
the speaker opening is disposed on the second surface of the body portion housing and configured to be oriented downward towards the ground surface, the supporting post extends from the second surface, and the loudspeaker faces the speaker opening.

2. The supporting audio leg of claim 1, further comprising a controller and a USB connection, wherein:
the controller is configured to operate the loudspeaker,
the USB connection is configured to communicate with the controller,
the controller is disposed in the interior area of body portion, and
the USB connection is located on the body portion housing of the supporting audio leg.

3. The supporting audio leg of claim 1, further comprising a controller, wherein:
the controller is configured to operate the loudspeaker and a light source,
the controller is disposed in the interior area of body portion, and
the light source is disposed on the body portion housing, the supporting post, or the furniture item body.

4. The supporting audio leg of claim 1, wherein the function is one of playing audio through the loudspeaker, adjusting a position of a component of the furniture item body, activating a heater or a cooler in the furniture item body, turning on a light source, and activating a massager.

5. The supporting audio leg of claim 1, further comprising a microphone configured for receiving the speech signal and relaying the speech signal to the phonetic recognition module, wherein the microphone is disposed in or on the body portion housing.

6. The supporting audio leg of claim 5, wherein the microphone is disposed in the interior area of the body portion, the body portion housing comprises a microphone opening, the microphone faces the microphone opening, and the microphone opening is configured to be hidden.

7. A supporting leg, comprising:
a body portion including a body portion housing, wherein the body portion housing defines an interior area of the body portion;
a supporting post connected to and extending away from the body portion housing;
a speaker opening disposed on the body portion housing, wherein the speaker opening is offset from the supporting post and configured to face downwards towards the ground surface;
a control circuit positioned within the interior area of the body portion, wherein:
the control circuit includes a phonetic recognition module and an audio processing and controlling module electrically connected to the phonetic recognition module,
the phonetic recognition module is configured to receive a speech signal from a microphone,
the phonetic recognition module is configured for recognizing a voice command in the speech signal and relaying the voice command to the audio processing and controlling module,
the audio processing and controlling module is configured for controlling a function responsive to the voice command, and
the supporting leg is configured to support and elevate a furniture item body above a ground surface; and
a loudspeaker disposed in the interior area of the body portion, wherein:
the body portion housing comprises a first surface configured to attach to a bottom surface of the furniture item body, a second surface opposite the first surface and configured to face downward towards the ground surface, wherein the speaker opening is disposed on the second surface and the supporting post extends from the second surface.

8. The supporting leg of claim 7, wherein the function comprises playing audio through the loudspeaker.

9. The supporting leg of claim 8, wherein the loudspeaker faces the speaker opening.

10. The supporting leg of claim 7, further comprising a microphone disposed in or on the body portion housing or the supporting post, wherein the microphone is configured for receiving the speech signal and relaying the speech signal to the phonetic recognition module.

11. The supporting leg of claim 10, wherein the microphone is disposed in the interior area of the body portion, the body portion housing comprises a microphone opening, the microphone faces the microphone opening, and the microphone opening is located away from an exterior side of the furniture item body.

12. The supporting leg of claim 7, further comprising a USB connection, wherein:
the USB connection is configured to electrically communicate with the control circuit, and
the USB connection is located on the body portion housing.

13. The supporting leg of claim 7, further comprising a light source, wherein:
the control circuit is configured to operate the light source, and
the light source is disposed on the body portion housing or the supporting post.

14. The supporting leg of claim 7, further comprising a microphone disposed in the interior area of the body portion and configured for receiving the speech signal and relaying the speech signal to the phonetic recognition module, wherein the body housing further comprises a third surface extending between the first surface and the second surface, a microphone opening is disposed on the third surface, and the microphone faces the microphone opening.

15. The supporting leg of claim 14, wherein the third surface of the body housing has a first side configured to be proximate to and approximately parallel to a first exterior side surface of the furniture item body, a second side configured to be proximate to and approximately parallel to a second exterior side surface of the furniture item body, and a third side on which is disposed the microphone opening.

16. A furniture item, comprising:
a furniture item body including a bottom surface;
a main supporting audio leg including a body portion configured to be attached to the bottom surface of the furniture item body at a first location and a leg portion connected to and extending away from the body portion, wherein the body portion includes a body portion housing defining an interior area of the body portion, a first speaker opening disposed on the body portion housing, and a main loudspeaker positioned within the interior area of the body portion of the main supporting audio leg;
wherein the first speaker opening is offset from the leg portion and configured to face downwards towards the ground surface,
wherein the main supporting audio leg further comprises a control circuit positioned within the interior area of the body portion of the main supporting audio leg, wherein:
the control circuit includes a phonetic recognition module and an audio processing and controlling module electrically connected to the phonetic recognition module,
the phonetic recognition module is configured to receive a speech signal from a microphone,
the phonetic recognition module is configured for recognizing a voice command in the speech signal and relaying the voice command to the audio processing and controlling module, and
the audio processing and controlling module is configured for controlling a function responsive to the voice command, and
wherein the main supporting audio leg is configured to support the furniture item body and to extend from the bottom surface of the furniture item body to elevate the furniture item body above a ground surface; and
a secondary supporting audio leg including a body portion mounted to the bottom surface of the furniture item body at a second location and a leg portion connected to and extending away from the body portion of the secondary supporting audio leg, wherein:
the body portion of the secondary supporting audio leg includes a body portion housing defining an interior area of the body portion,
a secondary loudspeaker is positioned within the interior area of the body portion of the secondary supporting audio leg and configured to receive an audio signal from the control circuit, and
the secondary supporting audio leg is configured to support the furniture item body and to extend from the bottom surface of the furniture item body to elevate the furniture item body above a ground surface.

17. The furniture item of claim 16, further comprising a microphone disposed in the interior area of the body portion of the main supporting audio leg and configured for receiving the speech signal and relaying the speech signal to the phonetic recognition module, wherein:

the main loudspeaker faces the first speaker opening, the body portion housing of the secondary supporting audio leg comprises a second speaker opening, the secondary loudspeaker faces the second speaker opening, and the second speaker opening is configured to face downwards towards the ground surface.

* * * * *